US012786299B2

(12) United States Patent
An et al.

(10) Patent No.: US 12,786,299 B2
(45) Date of Patent: Nov. 3, 2026

(54) ELECTRONIC APPARATUS COMPRISING FLEXIBLE DISPLAY

(71) Applicant: SAMSUNG ELECTRONICS CO., LTD., Suwon-si (KR)

(72) Inventors: Jungchul An, Suwon-si (KR); Jooyoung Kang, Suwon-si (KR); Myunghoon Kwak, Suwon-si (KR); Heuisoo Jeon, Suwon-si (KR); Kwangtai Kim, Suwon-si (KR); Donghyun Yeom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 616 days.

(21) Appl. No.: 18/061,643

(22) Filed: Dec. 5, 2022

(65) Prior Publication Data

US 2023/0099802 A1 Mar. 30, 2023

Related U.S. Application Data

(63) Continuation of application No. PCT/KR2021/006928, filed on Jun. 3, 2021.

(30) Foreign Application Priority Data

Jun. 3, 2020 (KR) ........................ 10-2020-0067335

(51) Int. Cl.

| | |
|---|---|
| ***H04M 1/02*** | (2006.01) |
| ***G06F 1/16*** | (2006.01) |
| ***H04W 88/02*** | (2009.01) |

(52) U.S. Cl.

CPC ....... *H04M 1/0269* (2022.02); *H04M 1/0237* (2013.01); *H04M 1/0268* (2013.01); *H04W 88/02* (2013.01)

(58) Field of Classification Search

CPC .............................................. H04W 88/00–06

See application file for complete search history.

(56) References Cited

U.S. PATENT DOCUMENTS 9,419,065 B2 8/2016 Degner et al.
9,681,538 B2 6/2017 Ahn (Continued)

FOREIGN PATENT DOCUMENTS

CN 102902308 A 1/2013
CN 210489620 5/2020

(Continued)

OTHER PUBLICATIONS

Extended European Search Report dated Feb. 16, 2024 issued in European Patent Application No. 21818893.6.

(Continued)

*Primary Examiner* — San Htun
(74) *Attorney, Agent, or Firm* — Nixon & Vanderhye P.C.

(57) ABSTRACT

The disclosure provides an electronic device including a flexible display. According to an embodiment of the disclosure, an electronic device may include: a support plate; a flexible display disposed at the support plate and forming a screen including a flat part and a curved part extending from the flat part, wherein the flexible display includes a first section disposed along the flat part and the curved part and including a plurality of pixels; and a second section bent and extending from the curved part of the first section to be disposed between the first section and the support plate, and a display driving circuit disposed in the second section and disposed between the second section and the support plate.

15 Claims, 21 Drawing Sheets

(56) References Cited

U.S. PATENT DOCUMENTS

| | | | | |
|---|---|---|---|---|
| 9,793,334 | B2 | 10/2017 | Park et al. | |
| 10,219,057 | B2 | 2/2019 | Luce et al. | |
| 10,229,963 | B1 * | 3/2019 | Qi | G02F 1/13452 |
| 10,558,242 | B2 | 2/2020 | Kim et al. | |
| 10,602,623 | B1 * | 3/2020 | Myers | H04M 1/0268 |
| 10,602,645 | B2 | 3/2020 | Qi et al. | |
| 10,684,650 | B2 | 6/2020 | Sim et al. | |
| 10,736,211 | B2 | 8/2020 | Park et al. | |
| 10,868,264 | B2 | 12/2020 | Shin et al. | |
| 10,903,445 | B2 | 1/2021 | Baek et al. | |
| 11,024,693 | B2 | 6/2021 | Cho et al. | |
| 11,252,826 | B2 | 2/2022 | Park et al. | |
| 11,329,247 | B2 | 5/2022 | Baek et al. | |
| 2013/0058063 | A1 | 3/2013 | O'Brien | |
| 2014/0015743 | A1 * | 1/2014 | Seo | G06F 3/017 345/156 |
| 2015/0331451 | A1 | 11/2015 | Shin et al. | |
| 2016/0204366 | A1 | 7/2016 | Zhang et al. | |
| 2017/0060183 | A1 | 3/2017 | Zhang et al. | |
| 2018/0014417 | A1 | 1/2018 | Seo et al. | |
| 2018/0102072 | A1 | 4/2018 | Lee et al. | |
| 2018/0324964 | A1 * | 11/2018 | Yoo | G06F 1/1652 |
| 2019/0269011 | A1 | 8/2019 | Lee et al. | |
| 2019/0310302 | A1 | 10/2019 | Lee et al. | |
| 2019/0340959 | A1 * | 11/2019 | Park | H10K 77/111 |
| 2019/0377385 | A1 | 12/2019 | Bushnell | |
| 2020/0042131 | A1 | 2/2020 | Lee et al. | |
| 2020/0092407 | A1 | 3/2020 | Fournier et al. | |
| 2020/0170128 | A1 | 5/2020 | Kim | |
| 2020/0409421 | A1 | 12/2020 | Cho et al. | |
| 2021/0126223 | A1 * | 4/2021 | Choi | H10K 59/12 |
| 2021/0165456 | A1 | 6/2021 | Gao et al. | |
| 2023/0099802 | A1 | 3/2023 | An et al. | |

FOREIGN PATENT DOCUMENTS

| | | | |
|---|---|---|---|
| CN | 216434909 | U | 5/2022 |
| EP | 2945352 | | 11/2015 |
| EP | 3605270 | | 2/2020 |
| EP | 3623898 | | 3/2020 |
| KR | 10-2016-0058329 | | 5/2016 |
| KR | 10-2016-0081786 | | 7/2016 |
| KR | 10-2018-0036857 | | 4/2018 |
| KR | 10-2019-0003257 | | 1/2019 |
| KR | 10-2019-0106322 | | 9/2019 |
| KR | 10-2019-0112535 | | 10/2019 |
| KR | 10-2019-0113128 | | 10/2019 |
| KR | 10-2020-0021172 | | 2/2020 |
| KR | 10-2111376 | | 5/2020 |
| KR | 10-2113963 | | 5/2020 |
| KR | 10-2020-0061275 | A | 6/2020 |
| KR | 10-2266152 | | 6/2021 |
| KR | 10-2360492 | | 2/2022 |
| KR | 10-2391961 | | 4/2022 |
| KR | 10-2410542 | | 6/2022 |
| WO | 2018/057652 | | 3/2018 |

OTHER PUBLICATIONS

Indian Office Action dated Nov. 21, 2025 issued in Indian Patent Application No. 202217070171, 10 pp.

Chinese Office Action dated Aug. 12, 2025 issued in Chinese Patent Application No. 202110604955.8 and English translation, 14 pp.

European Search Report and Written Opinion dated Oct. 6, 2023 issued in European Patent Application No. 21818893.6.

* cited by examiner

ELECTRONIC APPARATUS COMPRISING FLEXIBLE DISPLAY

CROSS-REFERENCE TO RELATED APPLICATIONS

This application is a continuation of International Application No. PCT/KR2021/006928 designating the United States, filed on Jun. 3, 2021, in the Korean Intellectual Property Receiving Office and claiming priority to Korean Patent Application No. 10-2020-0067335, filed on Jun. 3, 2020, in the Korean Intellectual Property Office, the disclosures of which are incorporated by reference herein in their entireties.

BACKGROUND

Field

The disclosure relates to an electronic device including a flexible display.

Description of Related Art

With the development of digital technology, electronic devices are being provided in various forms such as a smart phone, a tablet personal computer (PC), and a personal digital assistant (PDA). Electronic devices are being designed to provide a larger screen while having a portable size that does not cause inconvenience to a user's hand.

An electronic device may include a display driving circuit (e.g., display drive integrated circuit (DDI)) electrically connected to a display. The display driving circuit may be disposed, for example, in an area of a substrate extended from or connected to the display. Further, the display driving circuit may be positioned to overlap the display by bending the substrate area and attaching the substrate area to a rear surface of the display. In order to provide a large screen, the electronic device may be implemented to expand the screen in a slide manner. The electronic device may include a flexible display as a slide-out display, and a part of the flexible display may be drawn out from an internal space of the electronic device, thereby expanding the screen. However, in the electronic device including such a slide-out display, it may be difficult to dispose the display driving circuit in the above-described manner in a limited mounting space of the electronic device without interfering with a sliding operation of the flexible display, and a disposition position thereof may also be limited.

SUMMARY

Embodiments of the disclosure provide an electronic device including a slide-out display for easily disposing a display driving circuit in a limited space of the electronic device without interfering with a sliding operation of the flexible display.

According to an example embodiment of the disclosure, an electronic device includes: a support plate; a flexible display disposed at the support plate and forming a screen including a flat part and a curved part extending from the flat part, wherein the flexible display includes a first section disposed along the flat part and the curved part and including a plurality of pixels; and a second section bent and extending from the curved part of the first section to be disposed between the first section and the support plate; and a display driving circuit disposed in the second section and disposed between the second section and the support plate.

According to an example embodiment of the disclosure, an electronic device includes: a housing; a sliding plate capable of sliding out from the housing; a flexible display configured to form a screen including a flat part, a first curved part extending from the flat part, and a second curved part extending from the flat part and positioned opposite to the first curved part with the flat part interposed therebetween, wherein the flexible display includes a first section disposed along the flat part and the first curved part, and disposed to overlap the sliding plate; a bendable section extending from the first section, forming the second curved part, and configured to be drawn out from an inner space of the housing during sliding out; and a second section bent and extending from the first curved part of the first section to be disposed between the first section and the sliding plate; and a display driving circuit disposed in the second section and disposed between the second section and the sliding plate.

According to an example embodiment of the disclosure, a display assembly includes: a flexible display, wherein the flexible display includes a first section including a plurality of pixels and forming a screen including a flat part and a curved part extending from the flat part; and a second section bent and extending from the curved part of the first section to be disposed to partially overlap the first section, a display driving circuit disposed in the second section; and a support sheet, wherein the support sheet is disposed at the flexible display along the first section and includes a plurality of openings disposed between the first section and the second section and disposed along the curved part.

According to various example embodiments of the disclosure, it is possible to easily dispose a display driving circuit in a limited mounting space of an electronic device without interfering with a sliding operation of a flexible display. Further, a partial area of the flexible display intended to be implemented as a curved part of a screen corresponding to at least a part of a disposition area of the display driving circuit can have flexibility contributing to non-raised attachment to a support plate in a housing.

Further, effects obtained or predicted by various example embodiments of the disclosure will be disclosed directly or implicitly in the detailed description of the various example embodiments of the disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments of the disclosure will be described in greater detail with reference to the accompanying drawings.

Figure 1A:
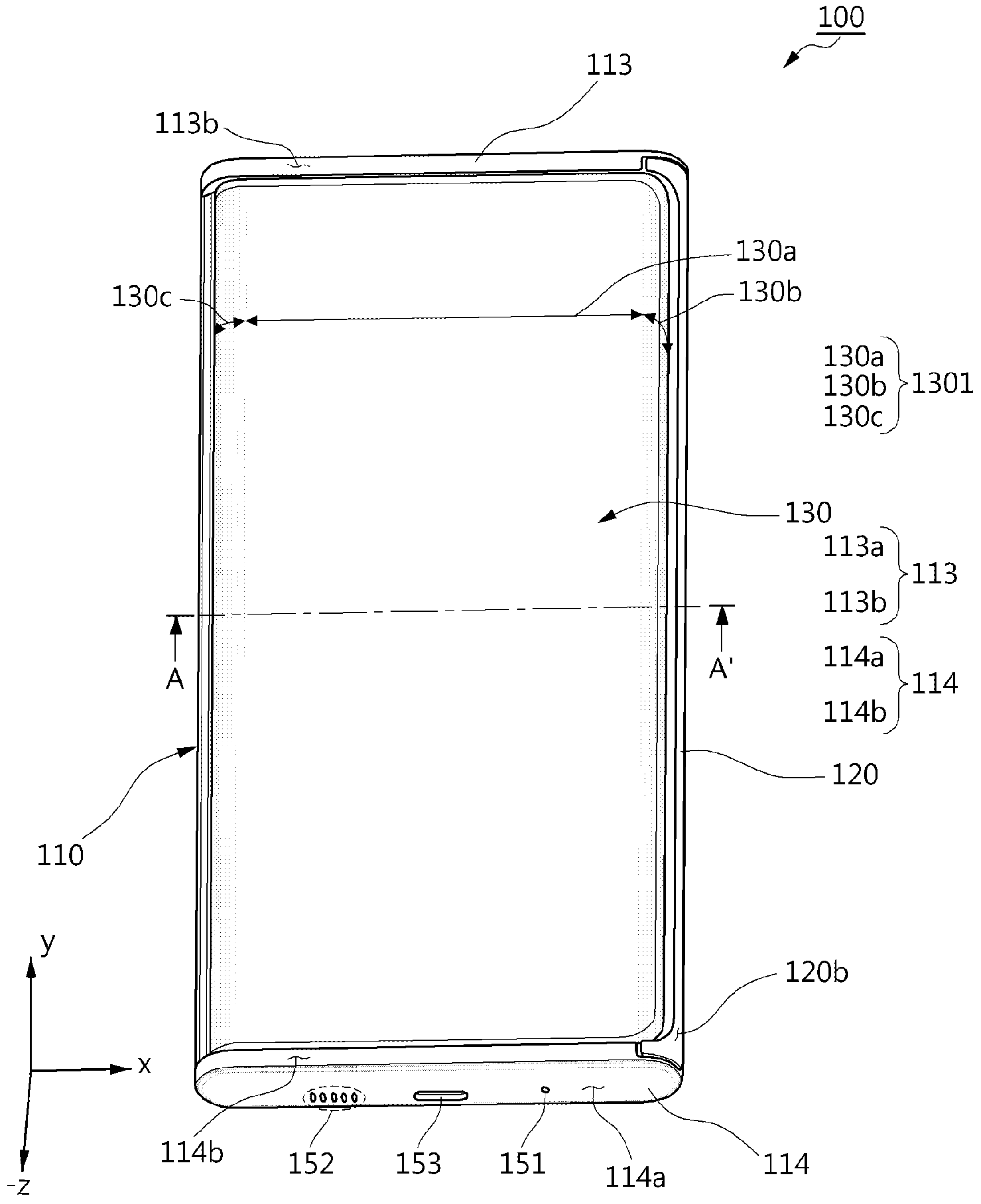
FIG. 1A is a front perspective view illustrating an electronic device in a closed state according to various embodiments.
Figure 1B:
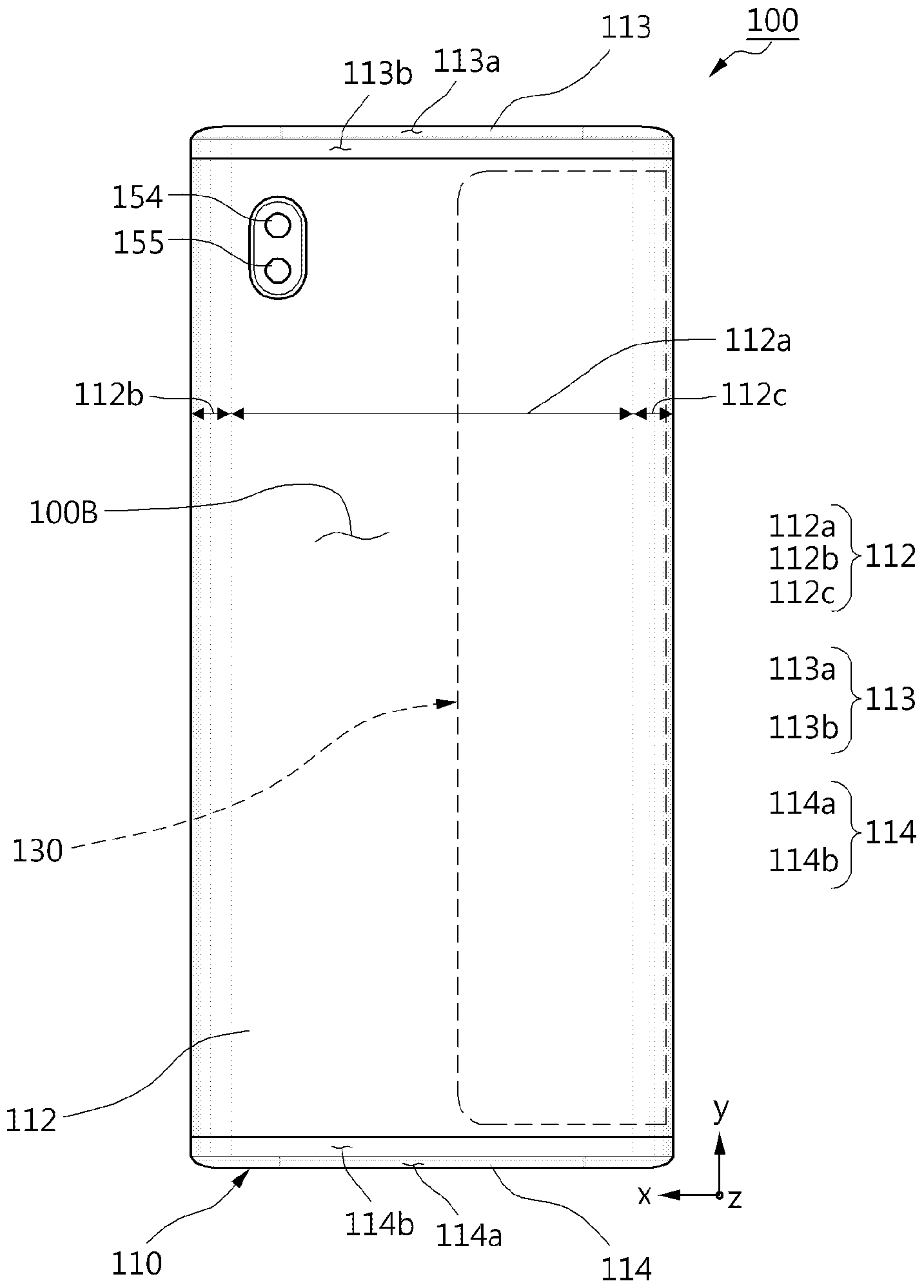
FIG. 1B is a rear perspective view illustrating an electronic device in a closed state according to various embodiments.
Figure 2A:
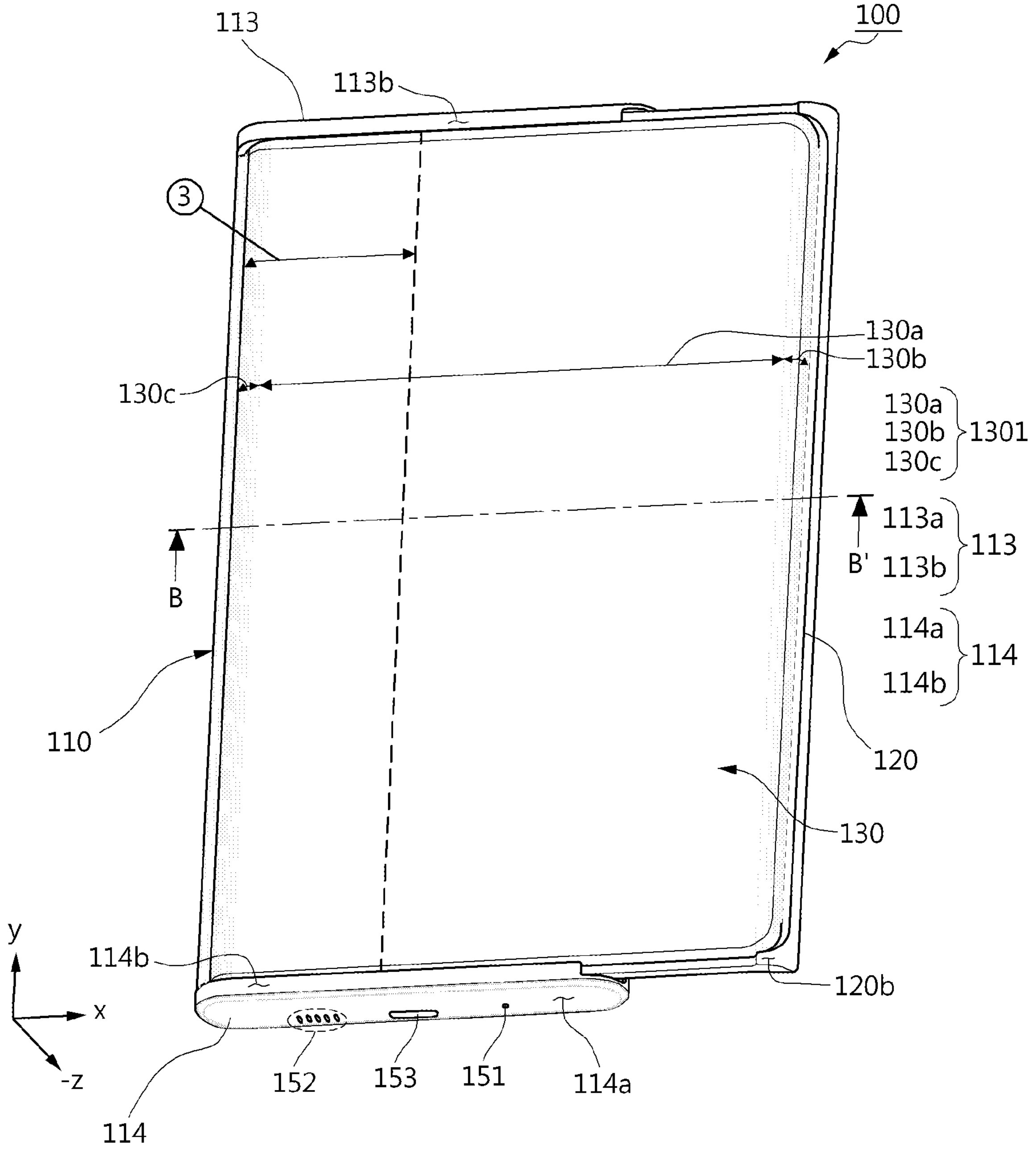
FIG. 2A is a front perspective view illustrating an electronic device in an open state according to various embodiments.
Figure 2B:
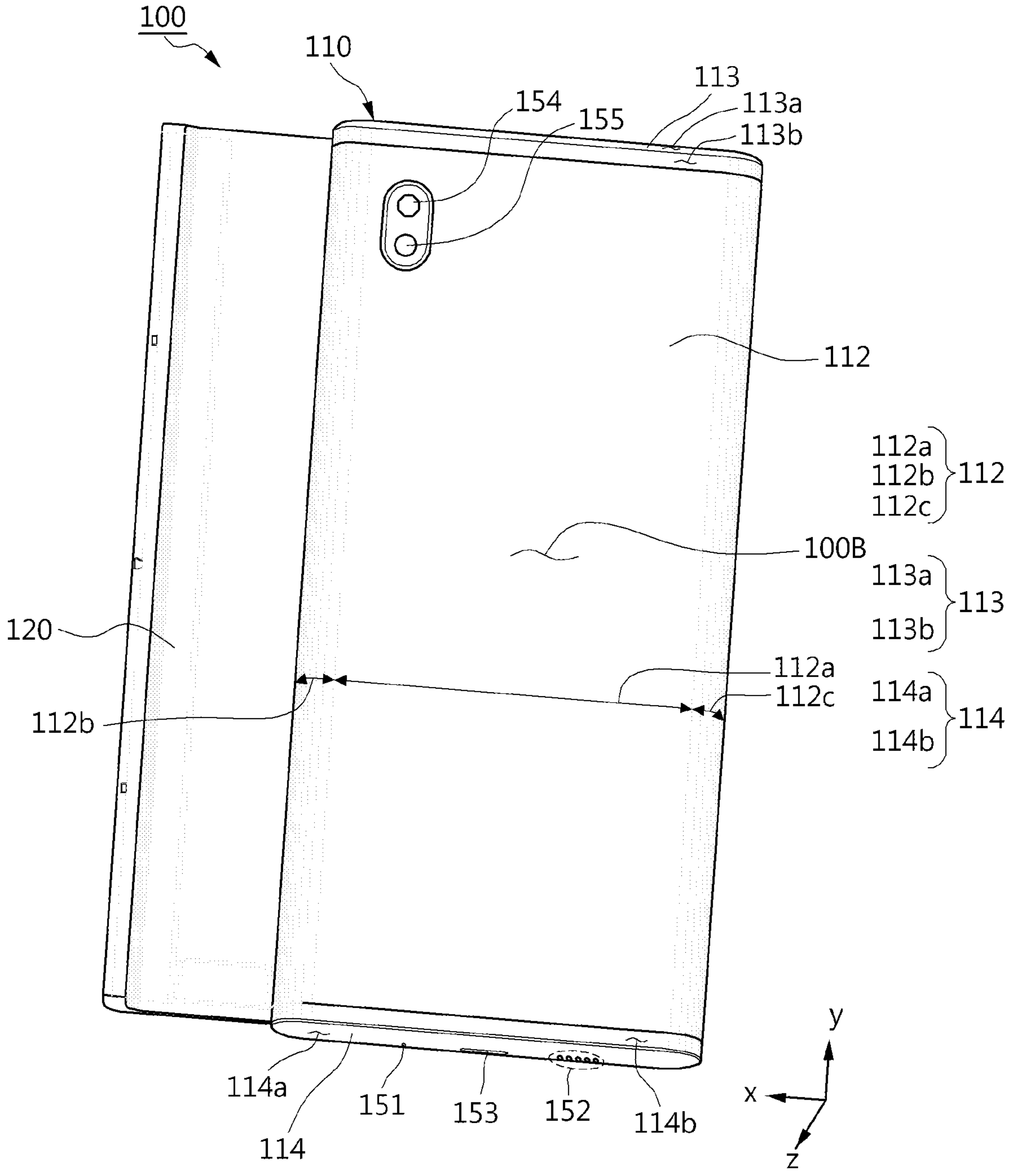
FIG. 2B is a rear perspective view illustrating an electronic device in an open state according to various embodiments.

FIG. 1A is a front perspective view illustrating an electronic device 100 in a closed state according to various embodiments. FIG. 1B is a rear perspective view illustrating the electronic device 100 in a closed state according to various embodiments. FIG. 2A is a front perspective view illustrating the electronic device 100 in an open state according to various embodiments. FIG. 2B is a rear perspective view illustrating the electronic device 100 in an open state according to various embodiments.

Referring to FIGS. 1A, 1B, 2A, and 2B, in an embodiment, the electronic device 100 may be implemented to expand a screen in a sliding manner. FIGS. 1A and 1B illustrate the electronic device 100 in a state in which a screen 1301 is not expanded, and FIGS. 2A and 2B illustrate the electronic device 100 in a state in which the screen 1301 is expanded. A state in which the screen 1301 is not expanded is a state in which a sliding plate 120 for sliding motion of a flexible display 130 is not slided-out, and may be referred to as a 'closed state' hereinafter. An expanded state of the screen 1301 is a maximally expanded state in which the screen 1301 is no longer expanded by sliding-out of the sliding plate 120 and may be referred to as an "open state" hereinafter. According to various embodiments, the open state may be defined as a state in which the screen 1301 is expanded compared to the closed state, and screens of various sizes may be provided according to a moving position of the sliding plate 120. The screen 1301 is an active area of the flexible display 130 that is visible to output an image, and the electronic device 100 may adjust the active area according to a movement of the sliding plate 120 or a movement of the flexible display 130. In the following description, the open state may refer to a state in which the screen 1301 is maximally expanded. In various embodiments, the flexible display 130 disposed to be slidable in the electronic device 100 of FIG. 1A to provide the screen 1301 may be referred to as a 'slide-out display' or an 'expandable display'.

According to an embodiment, the electronic device 100 may include a sliding structure based on a resilient structure related to the flexible display 130. When the flexible display 130 is moved to a preset distance by an external force, because of the elastic structure, the flexible display 130 may be switched from a closed state to an open state or from an open state to a closed state without any further external force.

According to various embodiments, when a signal is generated through an input device included in the electronic device 100, the electronic device 100 may be switched from a closed state to an open state or from an open state to a closed state because of a driving device such as a motor connected to the flexible display 130. For example, when a signal is generated through a hardware button or a software button provided through a screen, the electronic device 100 may be switched from a closed state to an open state or from an open state to a closed state.

According to various embodiments, when signals are generated from various sensors such as a pressure sensor, the electronic device 100 may be switched from a closed state to an open state or from an open state to a closed state. For example, when carrying or holding the electronic device 100 with a hand, a squeeze gesture in which a part of the hand (e.g., the bottom or a finger of the hand) presses within a specified section of the electronic device 100 may be detected through a sensor, and the electronic device 100 may be switched from a closed state to an open state or from an open state to a closed state in response thereto.

According to an embodiment, the flexible display 130 may include a bendable section ③ (see FIG. 2A). The bendable section ③ may provide an extended part of the screen 1301 when the electronic device 100 is switched from a closed state to an open state. When the electronic device 100 is switched from a closed state to an open state, the bendable section ③ is drawn out from an internal space of the electronic device 100; thus, the screen 1301 may be expanded. When the electronic device 100 is switched from an open state to a closed state, the bendable section ③ slides into an internal space of the electronic device 100; thus, the screen 1301 may be reduced. When the electronic device 100 is switched from an open state to a closed state, the bendable section ③ may be moved to the internal space of the electronic device 100 while being bent. The flexible display 130 may be implemented based on a flexible substrate (e.g., plastic substrate) made of a polymer material including polyimide (PI) or polyester (PET).

According to an embodiment, the electronic device 100 may include a housing 110, a sliding plate 120, and/or a flexible display 130.

The housing (or case) 110 may include, for example, a back cover 112, a first side cover 113, and/or a second side cover 114. The back cover 112, the first side cover 113, and/or the second side cover 114 may be connected to a support member (not illustrated) positioned inside the electronic device 100, and form at least part of the appearance of the electronic device 100.

The back cover 112 may form, for example, at least a part of a rear surface 100B of the electronic device 100. The back cover 112 may be substantially opaque. The back cover 112 may be made of coated or colored glass, ceramic, polymer, metal (e.g., aluminum, stainless steel (STS), or magnesium), or a combination of at least two of the above materials. According to various embodiments, at least a partial area of the back cover 112 may be transparent or include an opening, and an image output from the flexible display 130 in the closed state of FIG. 1B may be visible through the partial area.

According to an embodiment, the back cover 112 may include a flat part 112*a* and curved parts 112*b* and 112*c* positioned opposite to each other with the flat part 112*a* interposed therebetween. The curved parts 112*b* and 112*c* may be formed adjacent to both long edges (not illustrated), respectively of the back cover 112, and be curved toward the screen 1301 positioned opposite to the back cover 112 to be seamlessly extended. According to various embodiments, the back cover 112 may include one of the curved parts 112*b* and 112*c* or may be implemented without the curved parts 112*b* and 112*c*.

According to an embodiment, the first side cover 113 and the second side cover 114 may be positioned opposite to each other. The first side cover 113 may form a first side surface 113*a* of the electronic device 100, and the second side cover 114 may form a second side surface 114*a* of the electronic device 100 facing in a direction opposite to the first side surface 113*a*. The first side cover 113 may include a first edge (or first rim) 113*b* extended from an edge of the first side surface 113*a*, and the first edge 113*b* may form at least partially one side bezel of the electronic device 100. The second side cover 114 may include a second edge (or second rim) 114*b* extended from the edge of the second side surface 114*a*, and the second edge 114*b* may form at least partially the other side bezel of the electronic device 100. According to an embodiment, in a closed state of FIG. 1A, a surface of the first edge 113*b*, a surface of the second edge 114*b*, and a surface of the sliding plate 120 may be smoothly connected to form one curved part (not illustrated) corresponding to a first curved part 130*b* of the screen 1301. According to various embodiments, the surface of the first edge 113*b* and/or the surface of the second edge 114*b* may include a curved part (not illustrated) of the other side corresponding to the second curved part 130*c* side of the screen 1301 positioned opposite to the first curved part 130*b*.

According to an embodiment, the sliding plate 120 may slide on a support member (not illustrated) positioned inside the electronic device 100. The flexible display 130 may be disposed at the sliding plate 120, and the closed state of FIG. 1A or the open state of FIG. 2A may be formed based on a position of the sliding plate 120 on the support member. According to an embodiment, the flexible display 130 may be attached to the sliding plate 120 through an adhesive member (not illustrated). According to an embodiment, the adhesive member may include a heat-reactive adhesive, a photo-reactive adhesive, a general adhesive, and/or a double-sided tape. According to various embodiments, the flexible display 130 may be inserted into a recess (not illustrated) formed in the sliding plate 120 in a sliding manner to be disposed and fixed to the sliding plate 120. The sliding plate 120 serves to support the flexible display 130, and according to various embodiments, the sliding plate 120 may be referred to as a slidable support plate.

According to an embodiment, the sliding plate 120 may include a third edge 120*b* forming an outer surface of the electronic device 100, and the third edge 120*b* may form a bezel around the screen together with the first edge 113*b* and the second edge 114*b* in the closed state of FIG. 1A. In the closed state of FIG. 1A, a surface of the third edge 120*b* may be smoothly connected to the surface of the first edge 113*b* and/or the surface of the second edge 114*b*.

The flexible display 130 may form, for example, a screen 1301 positioned opposite to the back cover 112. Due to sliding out of the sliding plate 120, at least a part of the bendable section ③ may provide a state in which the screen 1301 is expanded (e.g., open state), as illustrated in FIG. 2A while coming out from the inside of the electronic device 100.

According to an embodiment, in the closed state of FIG. 1A, the screen 1301 may include a flat part 130*a*, and a first curved part 130*b* and a second curved part 130*c* positioned opposite to each other with the flat part 130*a* interposed therebetween. The first curved part 130*b* and the second curved part 130*c* may be substantially symmetrical to each other with the flat part 130*a* interposed therebetween. In the closed state of FIG. 1A, the first curved part 130*b* and the second curved part 130*c* may be positioned corresponding to the curved parts 112*b* and 112*c*, respectively, of the back cover 112 and be curved toward the back cover 112. When the electronic device 100 is switched from the closed state of FIG. 1A to the open state of FIG. 2A, the flat part 130*a* may be expanded. For example, at least partial area of the bendable section ③ forming the second curved part 130*c* in the closed state of FIG. 1A may be included in an expanded flat part 130*a* when the electronic device 100 is switched from the closed state of FIG. 1A to the open state of FIG. 2A and be formed as another area of the bendable section ③. According to an embodiment, the electronic device 100 may include an opening (not illustrated) for entering or withdrawing the bendable section ③, and a pulley (not illustrated) positioned at the opening. The pulley may be positioned corresponding to the bendable section ③, and a movement and direction of the bendable section ③ may be guided through a rotation of the pulley in the switch between the closed state of FIG. 1A and the open state of FIG. 2A. The first curved part 130*b* may be formed to correspond to a curved surface formed at one surface of the sliding plate 120. The second curved part 130*c* may be formed by a part corresponding to the curved surface of the pulley of the bendable section ③. The first curved part 130*b* may be positioned opposite to the second curved part 130*c* in a closed state or an open state of the electronic device 100 to improve an aesthetic impression of the screen 1301.

According to an embodiment, the flexible display 130 may further include a touch sensing circuit (e.g., touch sensor). According to various embodiments (not illustrated), the flexible display 130 may be combined with or disposed adjacent to a pressure sensor capable of measuring the intensity (pressure) of a touch and/or a digitizer that detects a magnetic field type stylus pen. For example, the digitizer may include a coil member disposed on a dielectric substrate to detect a resonance frequency of an electromagnetic induction method applied from an electronic pen.

According to an embodiment, the electronic device 100 may include a microphone hole 151 (e.g., an input module 1850 of FIG. 18), a speaker hole 152 (e.g., a sound output module 1855 of FIG. 18), a connector hole 153 (e.g., a connection terminal 1878 of FIG. 18), a camera module 154 (e.g., a camera module 1880 of FIG. 18), and/or a flash 155. According to various embodiments, the flash 155 may be included in the camera module 154 to be implemented. In various embodiments, the electronic device 100 may omit at least one of the components or may additionally include another component.

The microphone hole 151 may be formed, for example, in at least a part of the second side surface 114*a* corresponding to a microphone (not illustrated) positioned inside the electronic device 100. A position of the microphone hole 151 is not limited to the embodiment of FIG. 1A and may be various. According to various embodiments, the electronic device 100 may include a plurality of microphones capable of detecting a direction of sound.

The speaker hole 152 may be formed, for example, in at least a part of the second side surface 114*a* corresponding to a speaker positioned inside the electronic device 100. A position of the speaker hole 152 is not limited to the embodiment of FIG. 1A and may be various. According to various embodiments, the electronic device 100 may include a receiver hole for a call. In various embodiments, the microphone hole 151 and the speaker hole 152 may be implemented into one hole, or the speaker hole 152 may be omitted as in a piezo speaker.

The connector hole 153 may be formed, for example, in at least a part of the second side surface 114*a* corresponding to a connector (e.g., USB connector) positioned inside the electronic device 100. The electronic device 100 may transmit and/or receive power and/or data to and/or from an external electronic device electrically connected to the connector through the connector hole 153. A position of the connector hole 153 is not limited to the embodiment of FIG. 1A and may be various.

The camera module 154 and the flash 155 may be positioned, for example, at the rear surface 100B of the electronic device 100. The camera module 154 (e.g., the camera module 1880 of FIG. 18) may include one or more lenses, an image sensor, and/or an image signal processor. The flash 155 may include, for example, a light emitting diode or a xenon lamp. In various embodiments, two or more lenses (infrared cameras, wide-angle and telephoto lenses) and image sensors may be positioned at one surface of the electronic device 100. In various embodiments, the disclosure is not limited to the embodiment of FIG. 1B or 2B, and the electronic device 100 may include a plurality of camera modules. The camera module 154 may be one of a plurality of camera modules. For example, the electronic device 100 may include a plurality of camera modules (e.g., dual cameras or triple cameras) each having different properties (e.g., angle of view) or functions. For example, a plurality of camera modules (e.g., the camera module 154) including lenses having different angles of view may be configured, and the electronic device 100 may control to change the angle of view of the camera module performed in the electronic device 100 based on a user's selection. Further, the plurality of camera modules may include at least one of a wide-angle camera, a telephoto camera, a color camera, a monochrome camera, or an infrared (IR) camera (e.g., time of flight (TOF) camera, structured light camera). According to an embodiment, the IR camera may operate as at least a part of a sensor module (not illustrated) (e.g., a sensor module 1876 of FIG. 18).

According to various embodiments (not illustrated), the electronic device 100 may further include a camera module (e.g., front camera) that generates an image signal based on light received through the front surface (not illustrated) of the electronic device 100 placed in a direction toward the screen 1301. For example, the camera module 154 is not limited to the embodiment of FIG. 1B or 2B, and may be aligned with an opening (e.g., through hole or notch) formed in the flexible display 130 to be positioned inside the housing 110. By receiving light through the opening and a partial area of a transparent cover overlapped with the opening, the camera module 154 may generate an image signal. The transparent cover may be made of, for example, a material such as polyimide or ultra thin glass (UTG) to protect the flexible display 130 from the outside.

According to various embodiments, the disclosure is not limited to the embodiment of FIG. 1B or 2B, and the camera module 154 may be disposed at the lower end of at least a part of the screen 1301 of the flexible display 130. In this case, a position of the camera module 154 is not visually distinguished (or exposed), and a related function (e.g., image capture) using the camera module 154 may be performed. For example, when viewed from above the screen 1301 (e.g., viewed in the −z axis direction), the camera module 154 may be disposed to overlap at least part of the screen 1301 and obtain an image of an external subject without being exposed to the outside.

Figure 18:
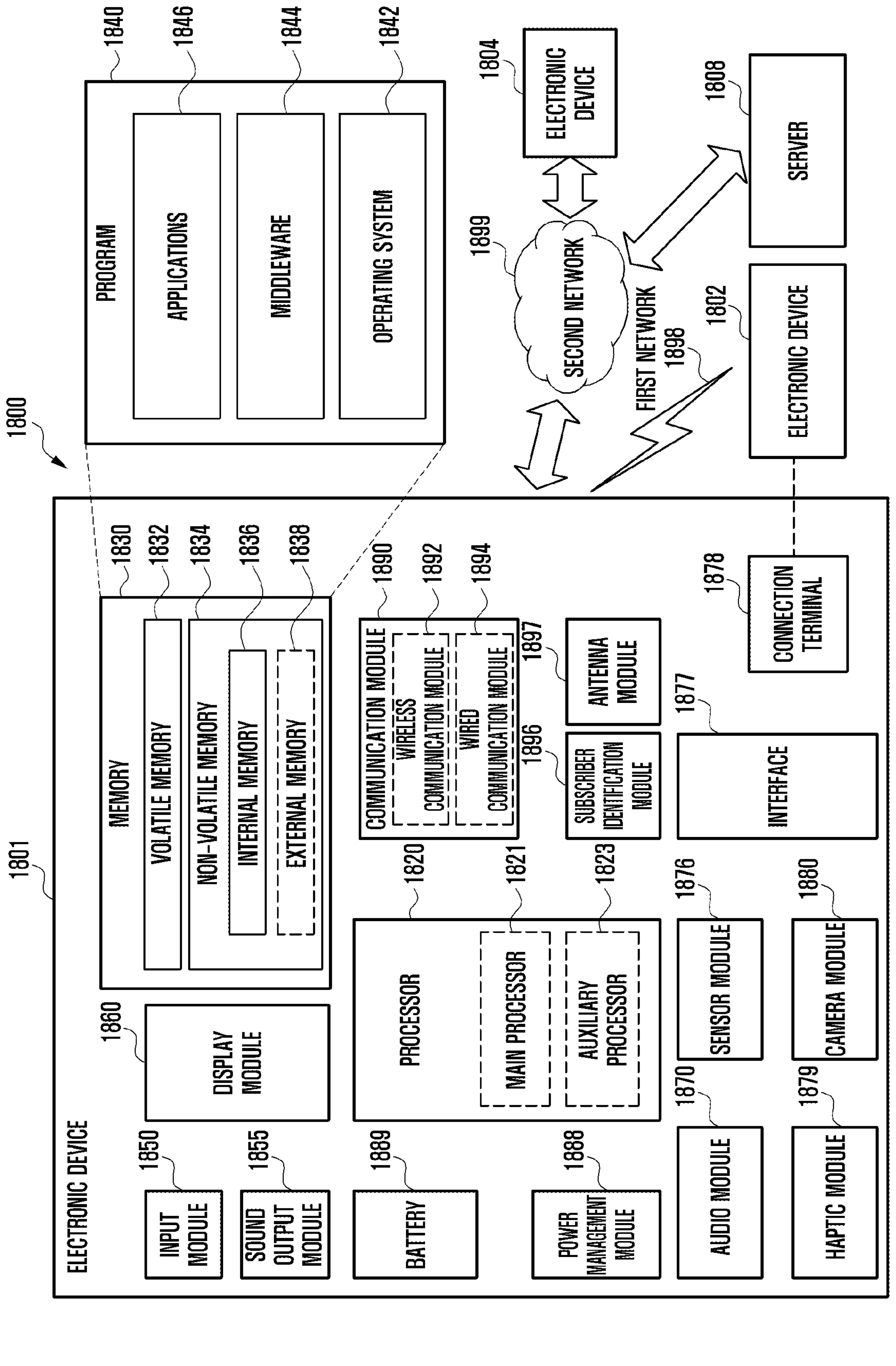
FIG. 18 is a block diagram illustrating an example configuration of an electronic device in a network environment according to various embodiments.

According to various embodiments (not illustrated), the electronic device 100 may further include a key input device (e.g., the input module 1850 of FIG. 18). The key input device may be positioned, for example, at the first side surface 113*a* of the electronic device 100 formed by the first side cover 113. In various embodiments (not illustrated), the key input device may include at least one sensor module.

According to various embodiments (not illustrated), the electronic device 100 may include various sensor modules (e.g., the sensor module 1876 of FIG. 18). The sensor module may generate an electrical signal or data value corresponding to an internal operating state or an external environmental state of the electronic device 100. For example (not illustrated), the sensor module may include a proximity sensor that generates a signal related to the proximity of an external object based on light received through the front surface (not illustrated) of the electronic device 100 placed in a direction in which the screen faces. For another example (not illustrated), the sensor module may include various biometric sensors such as a fingerprint sensor and a heart rate monitor (HRM) sensor for detecting information on a living body based on light received through the front surface or the rear surface 100B of the electronic device 100. According to various embodiments, the fingerprint sensor may be implemented with an ultrasonic method. The electronic device 100 may include at least one of various other sensor modules, for example, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

Figure 3:
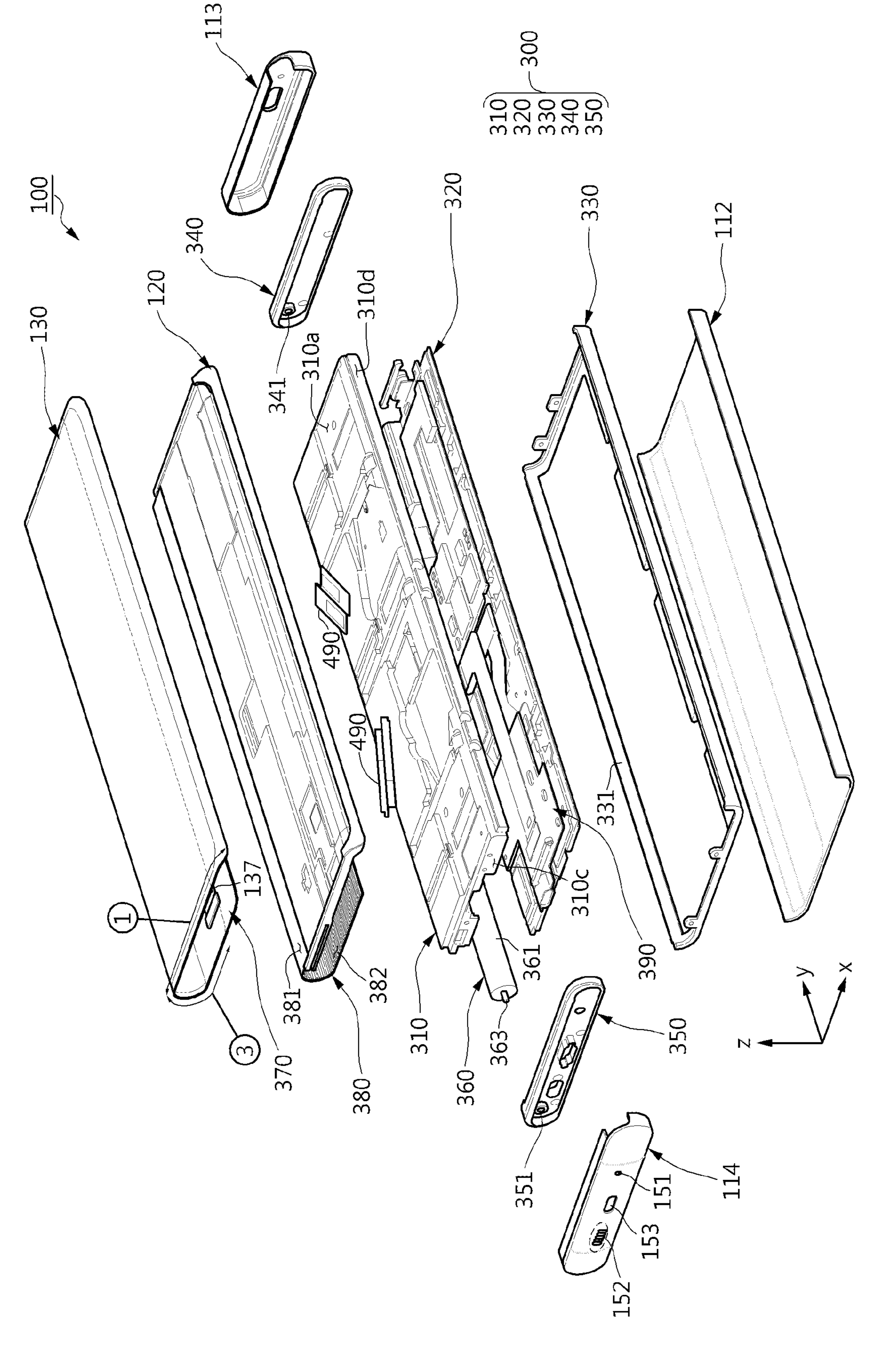
FIG. 3 is an exploded perspective view illustrating the electronic device of FIG. 1A according to various embodiments.

According to various embodiments (not illustrated), the disclosure is not limited to the embodiments of FIGS. 1A, 1B, 2A, and 2B and the electronic device 100 may be implemented in a structure in which a screen is expanded at the third edge 120*b* side when the sliding plate 120 slides out. For example, a partial area of the flexible display 130 forming the first curved part 130*b* in the closed state of FIG. 1A may be included in the expanded flat part 130*a* when the electronic device 100 is switched from the closed state of FIG. 1A to the open state of FIG. 2A and be formed in other area of the flexible display 130. FIG. 3 is an exploded perspective view illustrating the electronic device 100 of FIG. 1A according to various embodiments.

Referring to FIG. 3, in an embodiment, the electronic device 100 may include a back cover 112, a first side cover 113, a second side cover 114, a support member assembly 300, a pulley 360, a sliding plate 120, a flexible display 130, a support sheet 370, a multi-bar structure (or multi-bar assembly) 380, and/or a printed circuit board 390 (e.g., PCB, flexible PCB (FPCB), or rigid-flexible PCB (RFPCB)). Redundant descriptions of some of reference numerals of FIG. 3 may not be repeated.

According to an embodiment, the support member assembly (or support structure) 300 is a frame structure capable of withstanding a load and may contribute to durability or rigidity of the electronic device 100. At least a part of the support member assembly 300 may include a non-metallic material (e.g., polymer) or a metallic material. The housing 110 (see FIG. 1A) including the back cover 112, the first side cover 113, and/or the second side cover 114, the pulley 360, the sliding plate 120, the flexible display 130, the support sheet 370, the multi-bar structure 380, and/or the PCB 390 may be disposed in the support member assembly 300.

According to an embodiment, the support member assembly 300 may include a first support member 310, a second support member 320, a third support member 330, a fourth support member 340, and/or a fifth support member 350.

The first support member (or first bracket) 310 may be in the form of, for example, a plate, and the sliding plate 120 may be disposed at one surface 310*a* of the first support member 310. The second support member (or second bracket) 320 may be in the form of, for example, a plate overlapping the first support member 310, and be coupled to the first support member 310 and/or the third support member 330. The third support member 330 may be coupled to the first support member 310 and/or the second support member 320 with the second support member 320 interposed therebetween. The PCB 390 may be disposed in the second support member 320 between the first support member 310 and the second support member 320. The fourth support member 340 may be coupled to one side of an assembly (not illustrated) in which the first support member 310, the second support member 320, and the third support member 330 are coupled. The fifth support member 350 may be coupled to the other side of an assembly (not illustrated) in which the first support member 310, the second support member 320, and the third support member 330 are coupled, and may be positioned opposite to the fourth support member 340. The first side cover 113 may be coupled to the support member assembly 300 at the fourth support member 340 side. The second side cover 114 may be coupled to the support member assembly 300 at the fifth support member 350 side. The back cover 112 may be coupled to the support member assembly 300 at the third support member 330 side. At least a part of the first support member 310, the second support member 320, the third support member 330, the fourth support member 340, and/or the fifth support member 350 may include a metallic material and/or a non-metallic material (e.g., polymer). According to various embodiments, at least two of the first support member 310, the second support member 320, the third support member 330, the fourth support member 340, and/or the fifth support member 350 may be implemented integrally. According to various embodiments, the support member assembly 300 may refer to a structure forming at least a part of the first support member 310, the second support member 320, the third support member 330, the fourth support member 340, and/or the fifth support member 350.

The first support member 310 may include, for example, a first side surface (not illustrated) facing the fourth support member 340, a second side surface 310*c* facing the fifth support member 350 and positioned opposite to the first side surface, a third side surface (not illustrated) connecting one end of the first side surface and one end of the second side surface 310*c*, and/or a fourth side surface 310*d* connecting the other end of the first side surface and the other end of the second side surface 310*c* and positioned opposite to the third side surface. According to an embodiment, the pulley 360 may be positioned near the third side surface of the first support member 310. The pulley 360 may include a cylindrical roller 361 extended in a direction (e.g., +y axis direction) from the fifth support member 350 to the fourth support member 340. The pulley 360 may include a first rotation shaft (not illustrated) and a second rotation shaft 363 connected to the roller 361, and the first rotation shaft and the second rotation shaft 363 may be positioned opposite each other with the roller 361 interposed therebetween. The first rotation shaft may be interposed between the roller 361 and the first side cover 113, and be connected to the fourth support member 340. The second rotation shaft 363 may be interposed between the roller 361 and the second side cover 114, and be connected to the fifth support member 350. The fourth support member 340 may include a first through hole 341 into which the first rotation shaft is inserted, and the fifth support member 350 may include a second through hole 351 into which the second rotation shaft 363 is inserted. The roller 361 may be rotatable based on the first rotation shaft disposed in the fourth support member 340 and the second rotation shaft 363 disposed in the fifth support member 350.

According to an embodiment, the sliding plate 120 may be disposed in the support member assembly 300 to enable a sliding movement on the first support member 310. For example, between the first support member 310 and the sliding plate 120, a sliding structure for supporting and guiding a movement of the sliding plate 120 and coupling therebetween may be provided. According to an embodiment, the sliding structure may include at least one elastic structure 490. When the sliding plate 120 is moved to a preset distance by an external force, because of at least one elastic structure 490, the sliding plate 120 may be switched from the closed state of FIG. 1A to the open state of FIG. 2A or from the open state to the closed state without any further external force. At least one elastic structure 490 may be implemented based on various elastic members such as a torsion spring. For example, as the elastic structure 490, the torsion spring may include one end connected to the sliding plate 120, the other end connected to the first support member 310, and a spring part between the one end and the other end. When the sliding plate 120 is moved to a preset distance in a first direction of the slide-out by an external force, a position of the one end with respect to the other end is changed, so that the sliding plate 120 may be moved in the first direction because of elasticity of the spring without any further external force, thereby being switched from the closed state of FIG. 1A to the open state of FIG. 2A. When the sliding plate 120 is moved to a preset distance in a second direction opposite to the first direction by an external force, a position of the one end with respect to the other end is changed, so that the sliding plate 120 may be moved in the second direction due to elasticity of the spring part without any further external force, thereby being switched from the open state of FIG. 2A to the closed state of FIG. 1A.

According to an embodiment, the flexible display 130 may include a first section ① extended from the bendable section ③. The first section ① may be disposed in the sliding plate 120. When the electronic device 100 is switched from the closed state of FIG. 1A to the open state of FIG. 2A, while the bendable section ③ connected to the first section ① because of a movement of the sliding plate 120 slides out, the screen (see the screen 1301 of FIG. 2A) may be extended. When the electronic device 100 is switched from the open state of FIG. 2A to the closed state of FIG. 1A, because of a movement of the sliding plate 120, while the bendable section ③ at least partially enters into the electronic device 100, the screen (the screen 1301 of FIG. 1A) may be reduced. The support member assembly 300 may include an opening (not illustrated) for entering or withdrawing the bendable section ③, and the pulley 360 may be positioned at the opening. The opening includes one side gap between the first support member 310 and the third support member 330, and a part 331 of the third support member 330 adjacent to the opening may be a curved surface corresponding to the curved surface of the roller 361. The pulley 360 may be positioned corresponding to the bendable section ③, and a movement and direction of the bendable section ③ in the switch between the closed state of FIG. 1A and the open state of FIG. 2A may be guided based on a rotation of the pulley 360.

According to an embodiment, the support sheet 370 may be attached to the rear surface of the flexible display 130. The rear surface of the flexible display 130 may indicate a surface positioned opposite to a surface in which light is emitted from a display panel including a plurality of pixels. The support sheet 370 may contribute to durability of the flexible display 130. The support sheet 370 may reduce the influence of a load or stress that may occur in the switch between the closed state of FIG. 1A and the open state of FIG. 2A on the flexible display 130. The support sheet 370 may prevent and/or reduce the flexible display 130 from being damaged by a force transmitted therefrom when the sliding plate 120 is moved. Although not illustrated, the flexible display 130 may include a first layer including a plurality of pixels and a second layer coupled to the first layer. The first layer may include, for example, a light emitting layer including a plurality of pixels implemented with a light emitting device such as an organic light emitting diode (OLED) or a micro light emitting diode (LED), and other various layers (e.g., an optical layer for improving an image quality or outdoor visibility of a screen, as in a polarizing layer). According to an embodiment, when viewed from above the screen 1301 (e.g., viewed in −z axis direction), a plurality of pixels may not be disposed in a partial area of the flexible display 130 at least partially overlapping at least one electronic component (e.g., camera module or sensor module) included in the electronic device 100. According to various embodiments, when viewed from above the screen 1301, a partial area of the flexible display 130 at least partially overlapping at least one electronic component (e.g., camera module or sensor module) included in the electronic device 100 may include a pixel structure and/or a wiring structure different from that of other areas. For example, a partial area of the flexible display 130 at least partially overlapping the at least one electronic component (e.g., camera module or sensor module) may have a pixel density different from that of other areas. For example, a partial area of the flexible display 130 at least partially overlapping the at least one electronic component (e.g., camera module or sensor module) may be implemented as a substantially transparent area formed by a change of a pixel structure and/or a wiring structure, even if the opening is not included. The second layer may include various layers for supporting and protecting the first layer (e.g., cushion), shielding light, absorbing or shielding electromagnetic waves, or diffusing, dispersing, or radiating heat. According to an embodiment, at least a part of the second layer is a conductive member (e.g., metal plate), which may help reinforce rigidity of the electronic device 100 and be used for shielding ambient noise and dissipating heat emitted from peripheral heat-emitting components (e.g., display driving circuit). According to an embodiment, the conductive member may include at least one of copper (Cu), aluminum (Al), stainless steel (SUS), or CLAD (e.g., a laminated member in which SUS and Al are alternately disposed).

The support sheet 370 may cover at least a part of the second layer of the flexible display 130 to be attached to the rear surface of the second layer. The support sheet 370 may be made of various metallic materials and/or non-metal materials (e.g., polymers). According to an embodiment, the support sheet 370 may include stainless steel. According to various embodiments, the support sheet 370 may include engineering plastic. According to various embodiments, the support sheet 370 may be implemented integrally with the flexible display 130. According to an embodiment, the support sheet 370 may include a lattice structure (not illustrated) at least partially overlapped with a part where the flexible display 130 is bent and disposed (e.g., the bendable section ③ of FIG. 2A or 3, the first curved part 130*b* of FIG. 1A or 2A). The lattice structure may include a plurality of openings or a plurality of slits, and contribute to flexibility of the flexible display 130. According to various embodiments, the lattice structure may be referred to as an 'opening pattern'. According to various embodiments, the support sheet 370 may include a recess pattern (not illustrated) including a plurality of recesses in place of the lattice structure, and the recess pattern may contribute to flexibility of the flexible display 130. According to various embodiments, the lattice structure or the recess pattern may be extended to and disposed in at least a part of the flat part 130*a* of FIG. 1A or 2A. According to various embodiments, the support sheet 370 including a lattice structure or a recess pattern or a conductive member corresponding thereto may be formed in a plurality of layers.

According to an embodiment, the multi-bar structure 380 may be connected to the sliding plate 120, and include a first surface 381 facing the support sheet 370, and a second surface 382 positioned opposite to the first surface 381. The second surface 382 may be positioned to be spaced apart from the support sheet 370 with the first surface 381 interposed therebetween. When the sliding plate 120 is moved, a movement and direction of the multi-bar structure 380 may be guided by the roller 361 that rubs against the second surface 382 and rotates. According to an embodiment, the second surface 382 may include an arranged forms of a plurality of bars (not illustrated) extended in a direction (e.g., +y axis direction) from the second rotation shaft 363 of the pulley 360 toward the first rotation shaft (not illustrated). The multi-bar structure 380 may be bent in parts having a relatively thin thickness between a plurality of bars. In various embodiments, such a multi-bar structure 380 may be referred to as other terms such as a 'flexible track' or a 'hinge rail'.

According to an embodiment, in the closed state of FIG. 1A or the open state of FIG. 2A, at least a part of the multi-bar structure 380 may be positioned at the screen 1301 side, and support the bendable section ③ so as to maintain a form in which the bendable section ③ of the flexible display 130 is smoothly connected with the first section ① of the flexible display 130 without lifting. The multi-bar structure 380 may contribute to enable movement while maintaining a form smoothly connected to the first section ① without lifting the bendable section ③ in the switch between the closed state of FIG. 1A and the open state of FIG. 2A.

According to an embodiment, the support sheet 370 may substantially prevent/reduce elements (e.g., the multi-bar structure 380) positioned inside the electronic device 100 from being viewed through the flexible display 130.

In the expanded state of the screen (e.g., the open state of FIG. 2A), a non-smooth screen 1301 may be provided because of lifting due to the elasticity of the flexible display 130 and/or the support sheet 370. According to various embodiments, in order to prevent/reduce the non-smooth screen 1301, a tension structure (not illustrated) for the flexible display 130 and/or the support sheet 370 may be provided. The tension structure may contribute to a smooth slide motion while maintaining tension.

According to an embodiment, a processor (e.g., a processor 1820 of FIG. 18), a memory (e.g., a memory 1830 of FIG. 18), and/or an interface (e.g., an interface 1877 of FIG. 18) may be mounted in the PCB 390. The processor may include, for example, one or more of a central processing unit, an application processor, a graphic processing unit, an image signal processor, a sensor hub processor, or a communication processor.

The memory may include, for example, a volatile memory or a nonvolatile memory. The interface may include, for example, a high definition multimedia interface (HDMI), a universal serial bus (USB) interface, an SD card interface, and/or an audio interface. The interface may, for example, electrically or physically connect the electronic device 100 to an external electronic device and include a USB connector, an SD card/MMC connector, or an audio connector.

The electronic device 100 may include various other elements disposed in the PCB 390 or electrically connected to the PCB 390. For example, the electronic device 100 may include a battery (not illustrated) interposed between the first support member 310 and the second support member 320 or between the second support member 320 and the back cover 112. The battery (not illustrated) is a device for supplying power to at least one component of the electronic device 100 and may include, for example, a non-rechargeable primary cell, a rechargeable secondary cell, or a fuel cell. The battery (not illustrated) may be integrally disposed inside the electronic device 100 or may be disposed detachably from the electronic device 100. According to an embodiment, the electronic device 100 may include an antenna (not illustrated) interposed between the first support member 310 and the second support member 320 or between the second support member 320 and the back cover 112. The antenna (not illustrated) may include, for example, a near field communication (NFC) antenna, a wireless charging antenna, and/or a magnetic secure transmission (MST) antenna. The antenna (not illustrated) may perform, for example, short-range communication with an external device or may wirelessly transmit and receive power required for charging. In an embodiment, an antenna structure may be formed by a part of the first side cover 113 and/or the second side cover 114 or a combination thereof.

According to an embodiment, the electronic device 100 may include a flexible printed circuit board (FPCB) 137 that electrically connects the flexible display 130 and the PCB 390 to each other. For example, the FPCB 137 may be electrically connected to the PCB 390 through an opening (not illustrated) formed in the sliding plate 120 and an opening (not illustrated) formed in the first support member 310.

Figure 4:
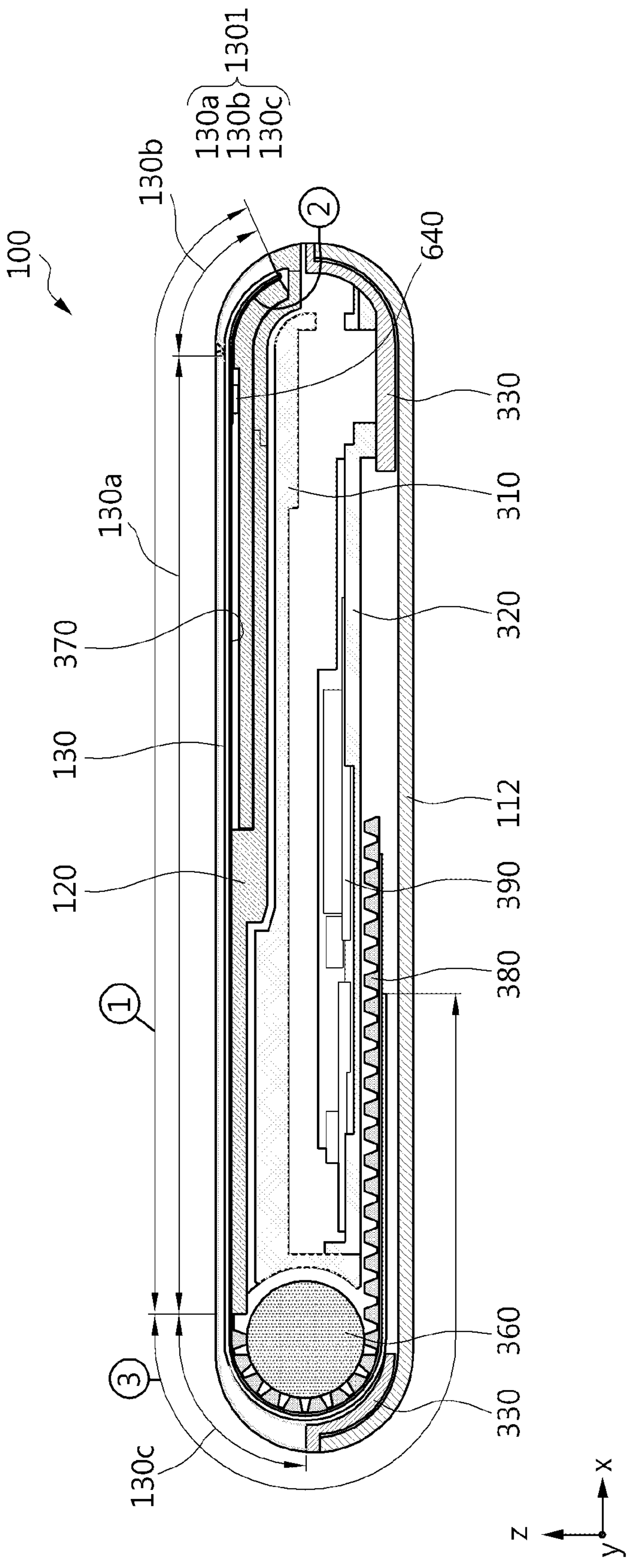
FIG. 4 is a cross-sectional view illustrating a part of the electronic device taken along line A-A' in the electronic device in a closed state of FIG. 1A according to various embodiments.
Figure 5:
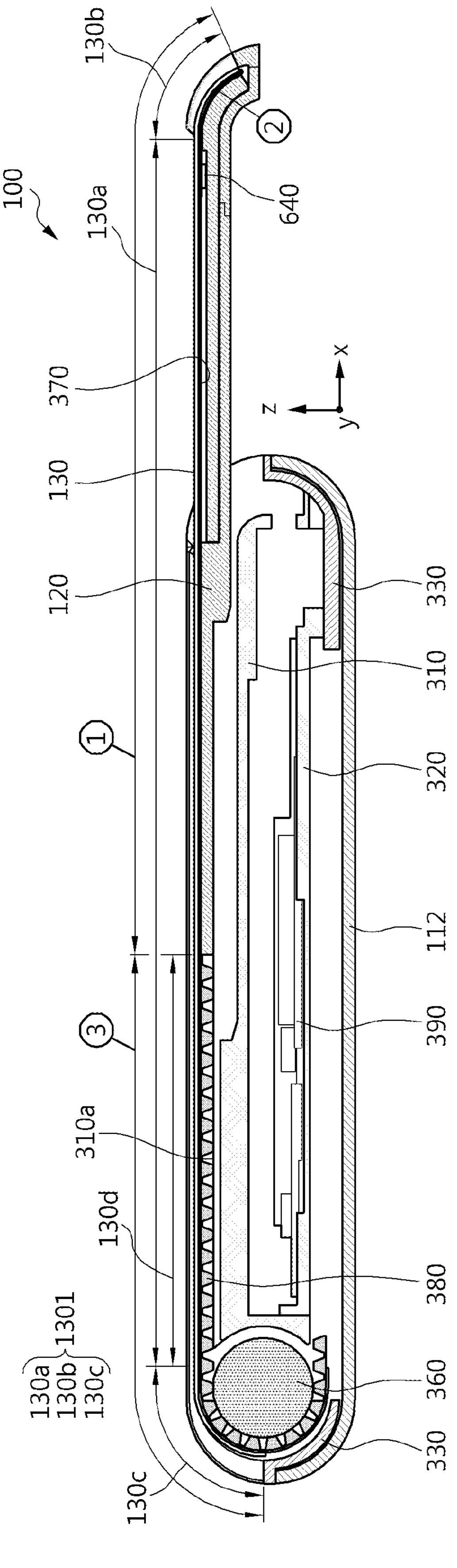
FIG. 5 is a cross-sectional view illustrating a part of the electronic device taken along line B-B' in the electronic device in an open state of FIG. 2A according to various embodiments.

FIG. 4 is a cross-sectional view illustrating a part of the electronic device 100 taken along line A-A' in the electronic device 100 in the closed state of FIG. 1A according to various embodiments. FIG. 5 is a cross-sectional view illustrating a part of the electronic device 100 taken along line B-B' in the electronic device 100 in an open state of FIG. 2A according to various embodiments.

Referring to FIGS. 4 and 5, in an embodiment, the electronic device 100 may include a back cover 112, a first support member 310, a second support member 320, a third support member 330, a sliding plate 120, a flexible display 130, a display driving circuit 640, a support sheet 370, a multi-bar structure 380, a PCB 390, and/or a pulley 360. Redundant descriptions of some of reference numerals of FIG. 4 or 5 may not be repeated.

According to an embodiment, the sliding plate 120 may be disposed on the first support member 310 to slide-out. The flexible display 130 may include a first section ①, a second section ②, and/or a bendable section ③. In a closed state of FIG. 4 or an open state of FIG. 5, the screen 1301 may include a flat part 130*a*, and a first curved part 130*b* and a second curved part 130*c* positioned opposite each other with the flat part 130*a* interposed therebetween. The first section ① may be disposed along the flat part 130*a* and the first curved part 130*b* of the screen 1301. The second section ② may be bent from the first section ① to be extended between the first section ① and the sliding plate 120. The bendable section ③ may be extended from the first section ① to be drawn out from an internal space of the electronic device 100 when the sliding plate 120 slides out. The first curved part 130*b* may be formed corresponding to a curved surface (not illustrated) formed in one surface of the sliding plate 120. The second curved part 130*c* may be formed by a part corresponding to a curved surface (not illustrated) of the pulley 360 in the bendable section ③.

According to an embodiment, the support sheet 370 may be disposed at the rear surface of the flexible display 130. According to various embodiments, the support sheet 370 may be included in the flexible display 130. The pulley 360 may be positioned inside the electronic device 100 and be connected to the bendable section ③ of the flexible display 130. The multi-bar structure 380 may be extended between the support sheet 370 and the pulley 360 from the sliding plate 120. The multi-bar structure 380 may contribute to enable movement while maintaining a form smoothly connected to the first section ① without lifting the bendable section ③ in the switch between the closed state of FIG. 4 and the open state of FIG. 5. In the closed state of FIG. 4 or the open state of FIG. 5, a part of the bendable section ③ forms the second curved part 130*c* of the screen 1301, and the second curved part 130*c* may be supported by the multi-bar structure 380 between the pulley 360 and the bendable sections ③ to be smoothly connected to the first section ① without lifting. In the open state of FIG. 5, a part 130*d* of the bendable section ③ may form a part of the flat part 130*a* of the screen 1301, and be supported by the multi-bar structure 380 between the bendable section ③ and one surface 310*a* of the first support member 310 to be smoothly connected to the first section ① without lifting.

According to various embodiments (not illustrated), a curved member including a curved part in which the multi-bar structure 380 contacts may be disposed in place of the pulley 360. For example, in the switch between the closed state of FIG. 4 and the open state of FIG. 5, the multi-bar structure 380 may be slid relative to the curved part of the curved member. According to various embodiments, in order to reduce a frictional force between the curved part and the multi-bar structure 380, a surface of the curved part or a surface of the multi-bar structure 380 may be surface-treated. According to various embodiments, the curved member may be connected to the support member assembly 300 of FIG. 3. According to various embodiments, the pulley 360 may be defined as a curved member rotatably implemented based on a friction with the multi-bar structure 380. According to various embodiments (not illustrated), a rail part (not illustrated) may be implemented to replace the curved member or formed along the curved part of the curved member to guide a movement of the multi-bar structure 380. The rail part may be formed, for example, in the housing 110 of FIG. 1A or in the support member assembly 300 of FIG. 3. According to an embodiment, the fourth support member 340 may include a first rail part for guiding a movement of the multi-bar structure 380 by inserting one side of the multi-bar structure 380. The fifth support member 350 may include a second rail part for guiding a movement of the multi-bar structure 380 by inserting the other side of the multi-bar structure 380.

According to an embodiment, the display driving circuit 640 may be disposed in the second section ② between the second section ② and the sliding plate 120. The display driving circuit 640 may include, for example, a display drive integrated circuit (DDI) or a DDI chip. For example, the display driving circuit 640 may include a touch display driver IC (TDDI) disposed in a chip on panel (COP) or chip on film (COF) method.

Figure 6A:
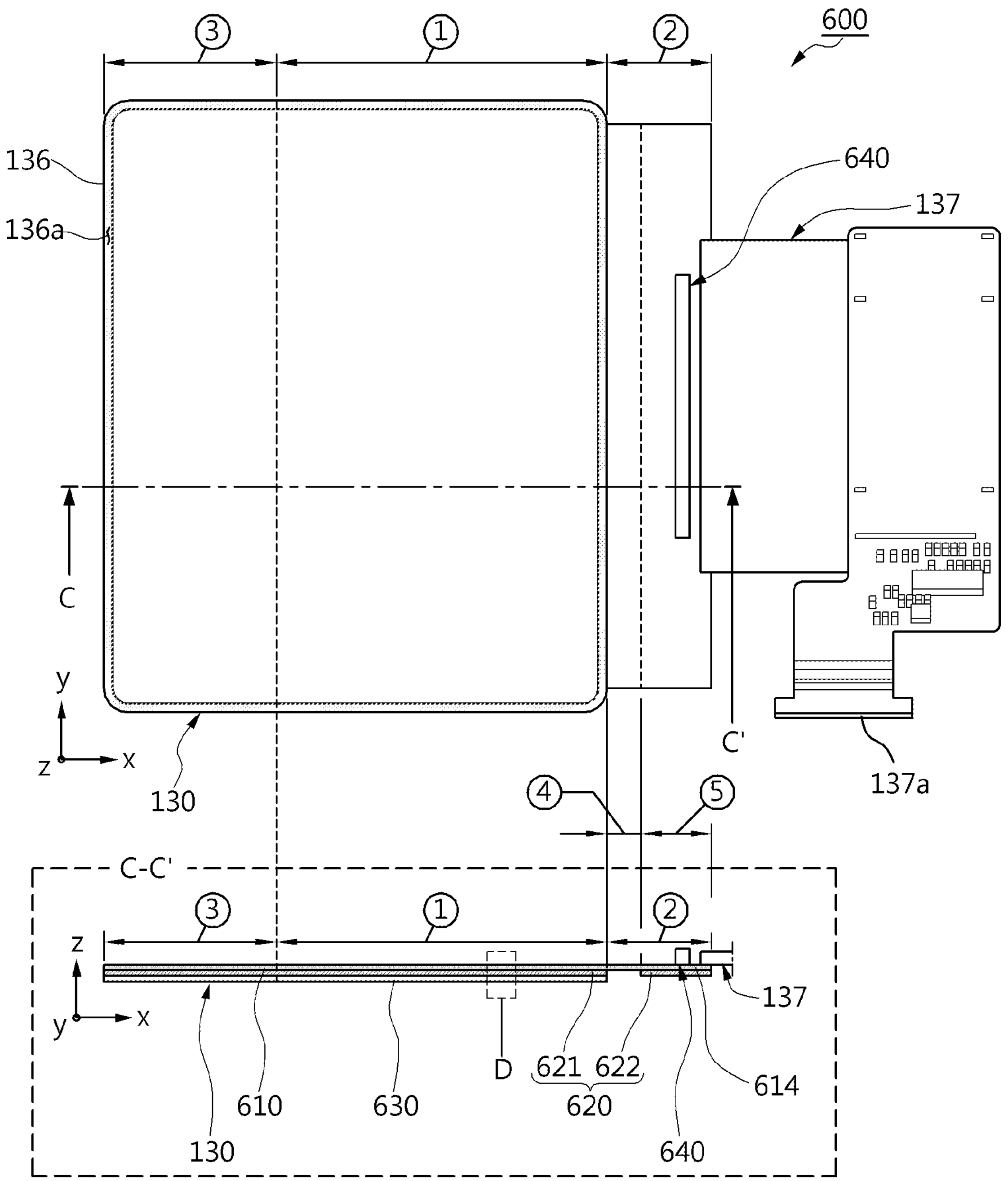
FIG. 6A is a diagram illustrating a display assembly in an unfolded state and a cross-sectional view taken along line C-C' according to various embodiments.

FIG. 6A is a diagram illustrating a display assembly 600 in an unfolded state and a cross-sectional view taken along line C-C' according to various embodiments.

Referring to FIG. 6A, in an embodiment, the display assembly 600 may include a flexible display 130, a FPCB 137, and/or a display driving circuit 640. Redundant descriptions of some of reference numerals of FIG. 6A may not be repeated.

According to an embodiment, the flexible display 130 may include a display panel 610, a base film 620, and/or a lower panel 630. The base film 620 may be interposed between the display panel 610 and the lower panel 630. Various polymer adhesive members (not illustrated) may be disposed between the display panel 610 and the base film 620 and/or between the base film 620 and the lower panel 630.

Figure 6B:
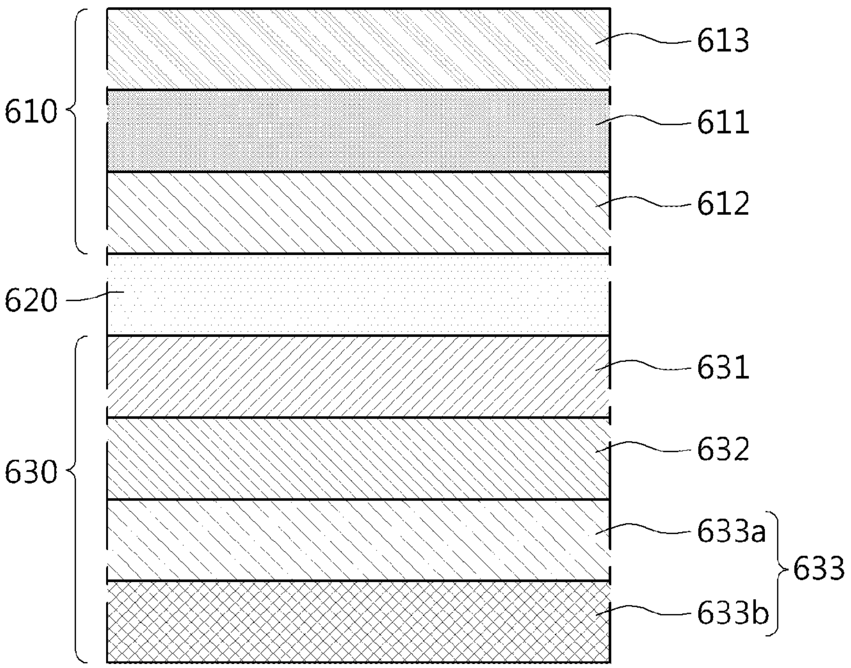
FIG. 6B is a cross-sectional structure of a part indicated by reference numeral D in the display assembly of FIG. 6A according to various embodiments.

FIG. 6B is a cross-sectional structure illustrating a part indicated by reference numeral D in the display assembly 600 of FIG. 6A according to various embodiments. The cross-sectional structure illustrated in FIG. 6B schematically illustrates a stacking relationship between components, and each component may be formed in substantially various thicknesses.

Referring to FIG. 6B, in an embodiment, the display panel 610 may include a light emitting layer 611 and a thin film transistor (TFT) film 612. The light emitting layer 611 may include, for example, a plurality of pixels implemented with a light emitting device such as an OLED or a micro LED. The light emitting layer 611 may be disposed on the TFT film 612 through organic material evaporation. The TFT film 612 may be, for example, interposed between the light emitting layer 611 and the base film 620. The TFT film 612 may refer to a structure in which at least one TFT is disposed on a flexible substrate (e.g., PI film) through a series of processes such as deposition, patterning, and etching. At least one TFT may control a current to the light emitting element of the light emitting layer 611 to turn on or off the pixel or adjust brightness of the pixel. At least one TFT may be implemented with, for example, an amorphous silicon (a-Si) TFT, a liquid crystalline polymer (LCP) TFT, a low-temperature polycrystalline oxide (LTPO) TFT, or a low-temperature polycrystalline silicon (LTPS) TFT. The display panel 610 may include a storage capacitor, and the storage capacitor may maintain a voltage signal to the pixel, maintain a voltage applied to the pixel within one frame, and/or reduce a change in a gate voltage of the TFT by leakage during a light emission time. By routines (e.g., initialization, data write) for controlling at least one TFT, the storage capacitor may maintain a voltage applied to the pixel at a predetermined time interval.

According to an embodiment, the display panel 610 may be implemented based on an OLED, and the display panel 610 may include an encapsulation (e.g., thin-film encapsulation (TFE)) 613 for covering the light emitting layer 611. Electrodes and organic materials that emit light in OLEDs may react very sensitively to oxygen and/or moisture to lose luminous properties thereof. According to an embodiment, the encapsulation 613 may seal the light emitting layer 611 so that oxygen and/or moisture do not penetrate into the OLED.

According to an embodiment, the base film 620 may include a flexible film made of a material such as polyimide or polyester. The base film 620 may serve to support and protect the display panel 610. According to various embodiments, the base film 620 may be referred to as a protective film, a back film, or a back plate.

According to various embodiments, the disclosure is not limited to the embodiment of FIG. 1B or 2B, and the camera module 154 may be disposed at the bottom of at least a part of the screen 1301 of the flexible display 130, and a position of the camera module 154 may not be visible. In this case, some of the plurality of layers included in the display panel 610 may be formed with a designated pattern (black matrix) for reducing diffraction of light entering the camera module 154, or a buffer layer (e.g., opaque metal layer) including designated patterns.

According to an embodiment, the lower panel 630 may include a plurality of layers for various functions. Various polymeric adhesive members (not illustrated) may be disposed between the plurality of layers. According to an embodiment, the lower panel 630 may include a light blocking layer 631, a buffer layer 632, and/or a lower layer 633. The light blocking layer 631 may be interposed between the base film 620 and the buffer layer 632. The buffer layer 632 may be interposed between the light blocking layer 631 and the lower layer 633.

According to an embodiment, the light blocking layer 631 may block light incident from the outside. For example, the light blocking layer 631 may include an embo layer. The emboss layer may be a black layer including an uneven pattern.

According to an embodiment, the buffer layer 632 may alleviate an external impact applied to the flexible display 130. For example, the buffer layer 632 may include a sponge layer or a cushion layer.

According to an embodiment, the lower layer 633 may diffuse, disperse, or dissipate heat generated in the electronic device 100 or the flexible display 130. The lower layer 633 may absorb or shield electromagnetic waves. The lower layer 633 may mitigate an external impact applied to the electronic device 100 or the flexible display 130. For example, the lower layer 633 may include a composite sheet 633*a* and/or a copper sheet 633*b*. According to an embodiment, the composite sheet 633*a* may be a sheet obtained by combining layers or sheets having different properties. For example, the composite sheet 633*a* may include at least one of polyimide or graphite. The composite sheet 633*a* may be replaced with a single sheet including one material (e.g., polyimide or graphite). The composite sheet 633*a* may be interposed between the buffer layer 632 and the copper sheet 633*b*. The lower layer 633 may include various layers for various other functions.

According to various embodiments (not illustrated), at least one additional polymer layer (e.g., a layer including PI, PET, or TPU) in addition to the base film 620 may be further disposed at the rear surface of the display panel 610.

According to various embodiments, at least one of a plurality of layers (e.g., the light blocking layer 631, the buffer layer 632, the composite sheet 633*a*, and the copper sheet 633*b*) included in the lower panel 630 may be omitted.

According to various embodiments, the disposition order of the plurality of layers included in the lower panel 630 is not limited to the embodiment of FIG. 6B and may be variously changed.

According to various embodiments, at least some of the plurality of layers included in the lower layer 633 may include an opening formed to correspond to a sensor (e.g., fingerprint sensor) positioned inside the electronic device 100. The sensor may overlap the opening or may be at least partially inserted into the space of the opening. At least two layers may include openings, and openings formed in each layer overlap each other, and may have substantially the same size and shape. According to various embodiments, the size or shape of the openings formed in each layer may not be the same.

According to an embodiment, the flexible display 130 may include a first section ①, a second section ②, and/or a bendable section ③. The first section ① may be interposed between the second section ② and the bendable section ③. Referring to FIGS. 4, 5, and 6A, the bendable section ③ may be extended from the first section ①, when the sliding plate 120 slides out, and the bendable section ③ may be drawn out from the inner space of the housing 110 (see FIG. 1A). The second section ② may be bent from the first section ① and be extended between the first section ① and the sliding plate 120. According to an embodiment, the second section ② may include a folding section (or folding part) ④ and a bonding section (or bonding part) ⑤, and the folding section ④ may be interposed between the first section ① and the bonding section ⑤. For example, when the flexible display 130 is disposed in the sliding plate 120, the folding section ④ may be bent with a corresponding radius of curvature, and the bonding section ⑤ may be interposed between the first section ① and the sliding plate 120.

According to an embodiment, the display panel 610 may be disposed along the first section ①, the second section ②, and the bendable section ③. According to an embodiment, the display panel 610 may include an extension part 614 extended from the first section ① and disposed in the second section ②. The FPCB 137 may be electrically connected to the extension part 614. The extension part 614 may include electrical paths (e.g., wirings implemented in a conductive pattern) electrically connecting at least one TFT of the TFT film 612 and the FPCB 137. The extension part 614 is a part that is not included in the screen (e.g., the screen 1301 of FIGS. 1A and 2A) and may not include a pixel implemented with a light emitting device. According to an embodiment, the light emitting layer 611 and the encapsulation 613 may not be extended to the extension part 614. According to an embodiment, the TFT film 612 may be extended to the extension part 614, but the extension part 614 may be implemented in a form that does not include a TFT. Electrical paths included in the extension part 614 may be disposed in the TFT film 612. According to various embodiments, the light emitting layer 611 may be extended to the extension part 614, but may be implemented in a form in which there are not substantially a plurality of pixels in the extension part 614. According to various embodiments, the encapsulation 611 may be extended to the extension part 614.

According to an embodiment, the lower panel 630 may be disposed along the first section ① and the bendable section ③.

According to an embodiment, the base film 620 may be disposed along the first section ①, the bendable section ③, and the bonding section ⑤ of the second section ②. For example, the base film 620 may include a first part 621 disposed along the first section ① and the bendable section ③, and a second part 622 disposed along the bonding section ⑤ of the second section ②. The base film 620 may not be disposed in the folding section ④ of the second section ②, which may contribute to flexibility of the folding section ④.

According to an embodiment, the FPCB 137 may be electrically connected to the display panel 610 in the bonding section ②. The extension part 614 of the display panel 610 may be electrically connected to the FPCB 137. For example, the FPCB 137 may be electrically connected to the extension part 614 based on anisotropic conductive film bonding (ACF bonding). ACF may be an anisotropic conductive film in which fine conductive particles (e.g., Ni, carbon, or solder ball) are mixed with an adhesive resin (e.g., a thermosetting resin) to form a film state and conduct electricity in only one direction. When ACF is disposed between the FPCB 137 and the extension part 614 and then compressed by applying heat and pressure, a conductive pattern (not illustrated) formed in the extension part 614 may be electrically connected to the conductive pattern formed in the FPCB 137 through conductive particles, and the adhesive resin may bond the extension part 614 and the FPCB 137 to each other. Electrical paths included in the extension part 614 may electrically connect at least one TFT and the FPCB 137. For example, the electrical paths may be formed in the TFT film 612 based on LTPS, LTPO, or a-Si together with the TFT. The FPCB 137 may be electrically connected to the flexible display 130 through various other methods (e.g., connection between connectors). One end (not illustrated) of the FPCB 137 may be electrically connected to the flexible display 130, and the other end (not illustrated) of the FPCB 137 may be electrically connected to the PCB 390 of FIG. 3, 4, or 5. The FPCB 137 may include a connector 137*a* for electrically connecting to the PCB 390.

According to an embodiment, the display driving circuit 640 may be disposed in the second section ② of the flexible display 130. A processor (e.g., application processor (AP)) (e.g., the processor 1820 of FIG. 18) may be disposed at the PCB 390 of FIG. 3, 4, or 5, and a signal commanded by the processor may be transferred to the display driving circuit 640 through the FPCB 137. According to an embodiment, the display driving circuit 640 may be disposed at the extension part 614 of the display panel 610, as illustrated in FIG. 6A (e.g., chip-on panel (COP) method). According to various embodiments (not illustrated), the display driving circuit 640 may be disposed in the display assembly 600 in a chip-on film (COF) method. The COF method may have a structure in which the display driving circuit 640 is disposed at a separate flexible film substrate that electrically connects the lower panel 630 and the FPCB 137. In the COF method, the flexible film substrate and the FPCB 137 may be connected by ACF bonding. According to various embodiments, the display driving circuit 640 may be disposed in the extension part 614 of the display panel 610 (or the flexible film substrate in COF) through tape automated bonding (TAB).

According to an embodiment, the display driving circuit 640 may be electrically connected to the FPCB 137 and the TFTs in the flexible display 130 through electrical paths included in the extension part 614 of the display panel 610. According to an embodiment, the display driving circuit 640 may serve as a signal path between the flexible display 130 and the processor disposed at the PCB 390 of FIG. 3, 4, or 5, to control the pixels through TFTs within the flexible display 130. For example, the display driving circuit 640 may have a function of turning on or off pixels included in the flexible display 130 and be electrically connected to the gate electrode of the TFT. The display driving circuit 640 may have a function of making a color difference by adjusting an amount of a red, green, blue (RGB) signal of a pixel, and be electrically connected to a source electrode of the TFT. The TFT may include a gate line electrically connecting the display driving circuit 640 and the gate electrode thereof, and a source line (or data line) electrically connecting the display driving circuit 640 and the source electrode thereof. According to various embodiments, the display driving circuit 640 may operate to correspond to a red, green, blue, white (RGBW) method in which a white pixel is added to an RGB pixel.

According to various embodiments (not illustrated), the display driving circuit 640 may be disposed at the FPCB 137.

According to various embodiments, the display driving circuit 640 may be a DDI package. The DDI package may include a DDI (or DDI chip), a timing controller (T-CON), a graphic RAM (GRAM), or power generating circuits. According to various embodiments, the graphic RAM may be omitted, or a memory provided separately from the display driving circuit 640 may be used. The timing controller may convert a data signal input from the processor to a signal required in the DDI. The timing controller may play a role of adjusting input data information to signals suitable for a gate driver (or gate IC) and a source driver (or source IC) of the DDI. The graphic RAM may serve as a memory for temporarily storing data to be input to the DDI driver (or IC). The graphic RAM may store the input signal and send the input signal back to the DDI driver, which may process the signal by interacting with the timing controller. The power driver may generate a voltage for driving the flexible display 130 and supply required voltages to the gate driver and the source driver of the DDI.

Referring to FIG. 6A, in an embodiment, the flexible display 130 may include a bezel area 136*a* formed adjacent to the edge 136 along the edge 136 thereof. The bezel area 136*a* may not include a pixel implemented with a light emitting device such as an OLED, and may include, for example, a black material or a black-based material having relatively low light transmittance. The bezel area 136*a* may be implemented by coating or printing a light shielding material on a transparent cover protecting the flexible display 130. In the open state of FIG. 2A, the bezel area 136*a* may be placed between the screen 1301 and the slide-out mechanism structure around the screen 1301 to contribute to an improved aesthetic external appearance of the electronic device 100. In an embodiment, in the closed state of FIG. 1A, there may not be a bezel area at the opening (not illustrated) side for entering or withdrawing the bendable section ③, but in various embodiments, the bezel area may be implemented by a software method. The software method of bezel area may be implemented, for example, by not activating a partial area of the flexible display 130 or through an image displayed in a partial area of the flexible display 130. According to various embodiments, the flexible display 130 may be implemented to minimize and/or reduce the bezel area 136*a* or substantially eliminate the bezel area 136*a*. In this case, the mechanism structure around the screen 1301 may be implemented into a slim form factor capable of sliding out without deteriorating an aesthetic external appearance, or in some cases, the bezel area may be implemented in a software method for the closed state of FIG. 1A or the open state of FIG. 2A. According to various embodiments, a signal line of the flexible display 130 and/or a touch screen panel (TSP) electrode may be disposed in the bezel area 136*a*.

Figure 7:
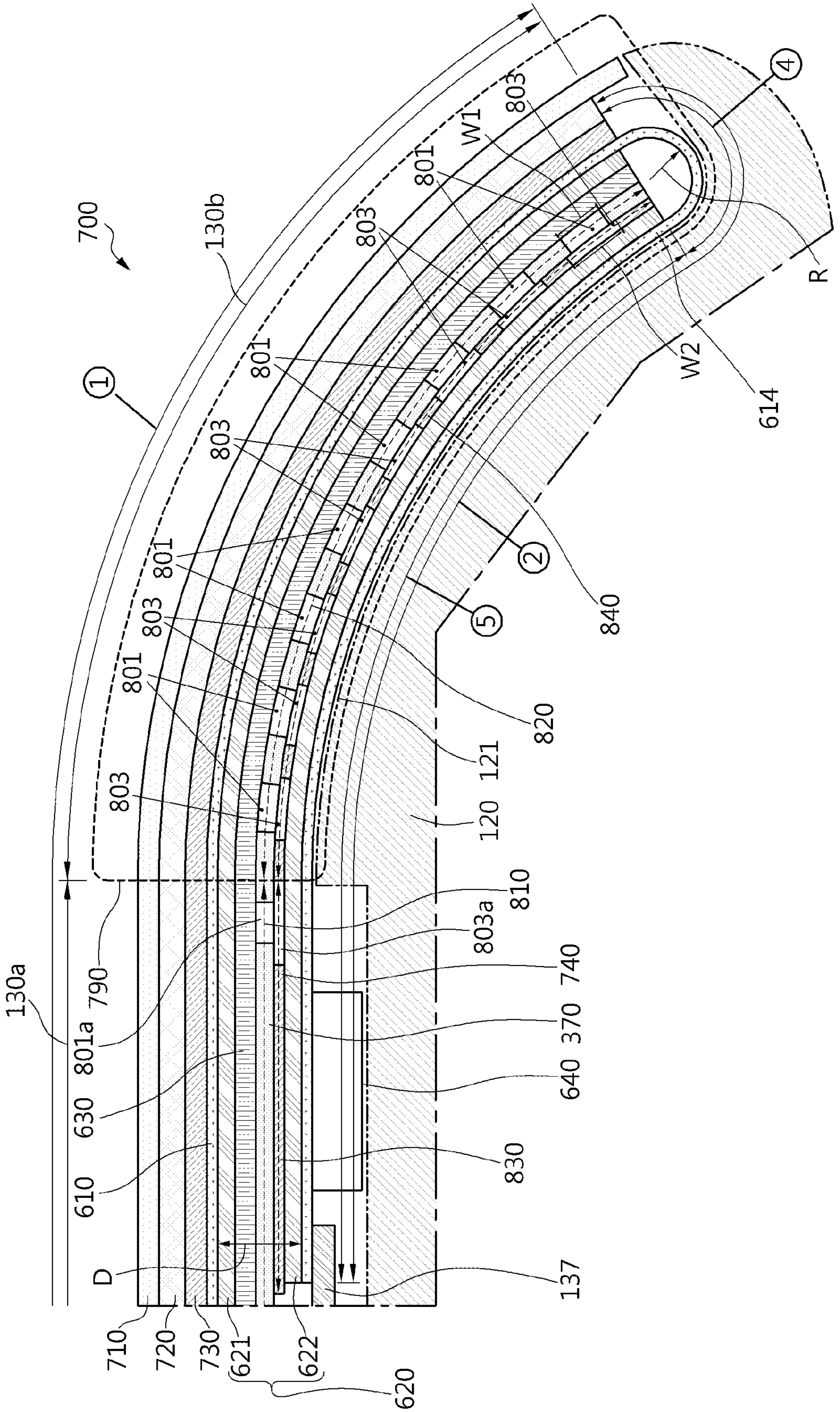
FIG. 7 is a cross-sectional view illustrating a part of a display assembly according to various embodiments.

FIG. 7 is a cross-sectional view illustrating a part of a display assembly 700 according to various embodiments.

Referring to FIG. 7, in an embodiment, the display assembly 700 may include a display panel 610, a base film 620, a lower panel 630, a display driving circuit 640, a FPCB 137, a transparent cover 710, an optical transparent adhesive member 720, an optical layer 730, a support sheet 370, and/or a spacer 740. The base film 620 may include a first part 621 positioned in the first section ① of the flexible display 130 and a second section 622 positioned in the second section ② of the flexible display 130. Redundant descriptions of some of reference numerals of FIG. 7 may not be repeated.

According to an embodiment, the flexible display 130 may be disposed at the sliding plate 120 of FIG. 3, 4, or 5, and form a screen including a flat part 130*a*, and a first curved part 130*b* extended from the flat part 130*a*. The first section ① of the flexible display 130 may be disposed along the flat part 130*a* and the first curved part 130*b*. The second section ② of the flexible display 130 may include a folding section ④ and a bonding section ⑤. For example, the folding section ④ may be bent with a corresponding radius of curvature R, and the bonding section ⑤ may be positioned to overlap with the first section ①. The display panel 610 may be disposed along the first section ① and the second section ②. The first part 621 of the base film 620 may be disposed along the first section ①, and the second part 622 of the base film 620 may be disposed along the bonding section ⑤ of the second section ⓪.

According to an embodiment, the display driving circuit 640 may be disposed in the second section ②. For example, the display driving circuit 640 may be disposed at an extended part 614 of the display panel 610 and be positioned to overlap at least partially with the flat part 130*a*. The FPCB 137 may be electrically connected to the extension part 614 of the display panel 610. Because the electronic device 100 of FIG. 1A is implemented to slide out the sliding plate 120 in which the display assembly 700 is disposed, in order not to interrupt such a sliding operation, the display driving circuit 640 bends the folding section ④ at the first curved part 130*b* side to be disposed in the bonding section ⑤ interposed between the first section ① and the sliding plate 120, as in the examples illustrated in FIG. 6A or 7.

According to an embodiment, the transparent cover (or window) 710 may cover the display panel 610 of the flexible display 130. The transparent cover 710 may protect the flexible display 130 from the outside and be implemented in the form of, for example, a thin film (e.g., thin film layer) that may contribute to flexibility. According to an embodiment, the transparent cover 710 may include a plastic film (e.g., polyimide film) or thin-film glass (e.g., ultra thin glass (UTG)). The optical layer 730 may be interposed between the transparent cover 710 and the display panel 610.

According to various embodiments (not illustrated), the transparent cover 710 may include a plurality of layers. For example, the transparent cover 710 may have a form in which various coating layers are disposed in a plastic film or thin-film glass. For example, the transparent cover 710 may have a form in which at least one protective layer or coating layer including a polymer material (e.g., polyester (PET), polyimide (PI), or thermoplastic polyurethane (TPU)) is disposed in a plastic film or thin-film glass.

According to various embodiments, the transparent cover 710 may be implemented to have a relatively thin thickness in the bendable section ③. For example, at least one of the plurality of layers of the transparent cover 710 may not be at least partially expanded to the bendable section ③ compared to at least one other layer. According to various embodiments, the transparent cover 710 may be implemented to have a relatively thin thickness in at least a part of a section corresponding to the first curved part 130*b*. In this case, a form of the optically transparent adhesive member 720 between the optical layer 730 and the transparent cover 710 may be disposed in a form (e.g., different thickness) different from the embodiment of FIG. 7 in a section corresponding to the first curved part 130*b*.

The optical layer 730 may include, for example, a polarizing layer (or polarizer) or a phase retardation layer (or retarder). The polarizing layer and the phase retardation layer can improve outdoor visibility of the screen. According to an embodiment, the optical layer 730 may selectively pass through light generated from a light source of the display panel 610 and vibrating in a predetermined direction. According to various embodiments, a single layer in which the polarizing layer and the phase retardation layer are combined may be provided, and such a layer may be defined as a 'circular polarizing layer'. The optically transparent adhesive member 720 may be interposed between the transparent cover 710 and the optical layer 730 and include, for example, an optical clear adhesive (OCA), optical clear resin (OCR), or super view resin (SVR). According to various embodiments, the polarizing layer (or circular polarizing layer) may be omitted, and in this case, a black pixel define layer (PDL) and/or a color filter may be provided in place of the polarizing layer.

According to various embodiments (not illustrated), the display assembly 700 may include a touch sensing circuit (e.g., touch sensor). The touch sensing circuit may be implemented into a transparent conductive layer (or film) based on various conductive materials such as indium tin oxide (ITO). According to an embodiment, the touch sensing circuit may be disposed between the transparent cover 710 and the optical layer 730 (e.g., add-on type). According to an embodiment, the touch sensing circuit may be disposed between the optical layer 730 and the display panel 610 (e.g., on-cell type). According to an embodiment, the display panel 610 may include a touch sensing circuit or a touch sensing function (e.g., in-cell type).

According to various embodiments (not illustrated), the display panel 610 may be formed based on an OLED, and include an encapsulation 613 (see FIG. 6B) (e.g., thin-film encapsulation (TFE)) disposed between the light emitting layer 611 of FIG. 6B and the optical layer 730 of FIG. 7. For example, the encapsulation 613 may serve as a pixel protection layer for protecting a plurality of pixels of the light emitting layer 611. According to various embodiments (not illustrated), the flexible display 130 is a touch sensing circuit disposed at the encapsulation 613 between the encapsulation 613 and the optical layer 730, and may include a conductive pattern such as a metal mesh (e.g., aluminum metal mesh). For example, in response to bending of the flexible display 130, the metal mesh may have greater durability than that of a transparent conductive layer implemented with ITO.

According to various embodiments (not illustrated), the flexible display 130 may further include a pressure sensor capable of measuring the intensity (pressure) of a touch.

According to various embodiments, some of the plurality of layers included in the lower panel 630 may include a digitizer for detecting a pen input device (e.g., stylus pen). The digitizer may be, for example, an electromagnetic induction panel for sensing a magnetic field type pen input device. According to various embodiments, the electromagnetic induction panel may be omitted according to an implementation method of the pen input device. For example, in an embodiment in which the pen input device generates a signal using power of a battery included therein, the electromagnetic induction panel may be omitted.

According to various embodiments, a plurality of layers included in the display panel 610 or the lower panel 630, a stacked structure, or a stacking order thereof may various. According to various embodiments, the flexible display 130 may be implemented by omitting some of the components or adding other components according to a providing form thereof or a convergence trend.

According to an embodiment, the support sheet 370 may be attached to the lower panel 630 along the first section ① of the flexible display 130. Various polymer adhesive members (not illustrated) may be disposed between the support sheet 370 and the lower panel 630. When the flexible display 130 is disposed in the sliding plate 120, the folding section ④ of the second section ② may be bent with a corresponding radius of curvature R, and the bonding section ⑤ of the second section ② may be interposed between the first section ① and the sliding plate 120. For this reason, a part of the support sheet 370 may be interposed between the first section ① and the bonding section ⑤ of the second section ②.

Figure 8:
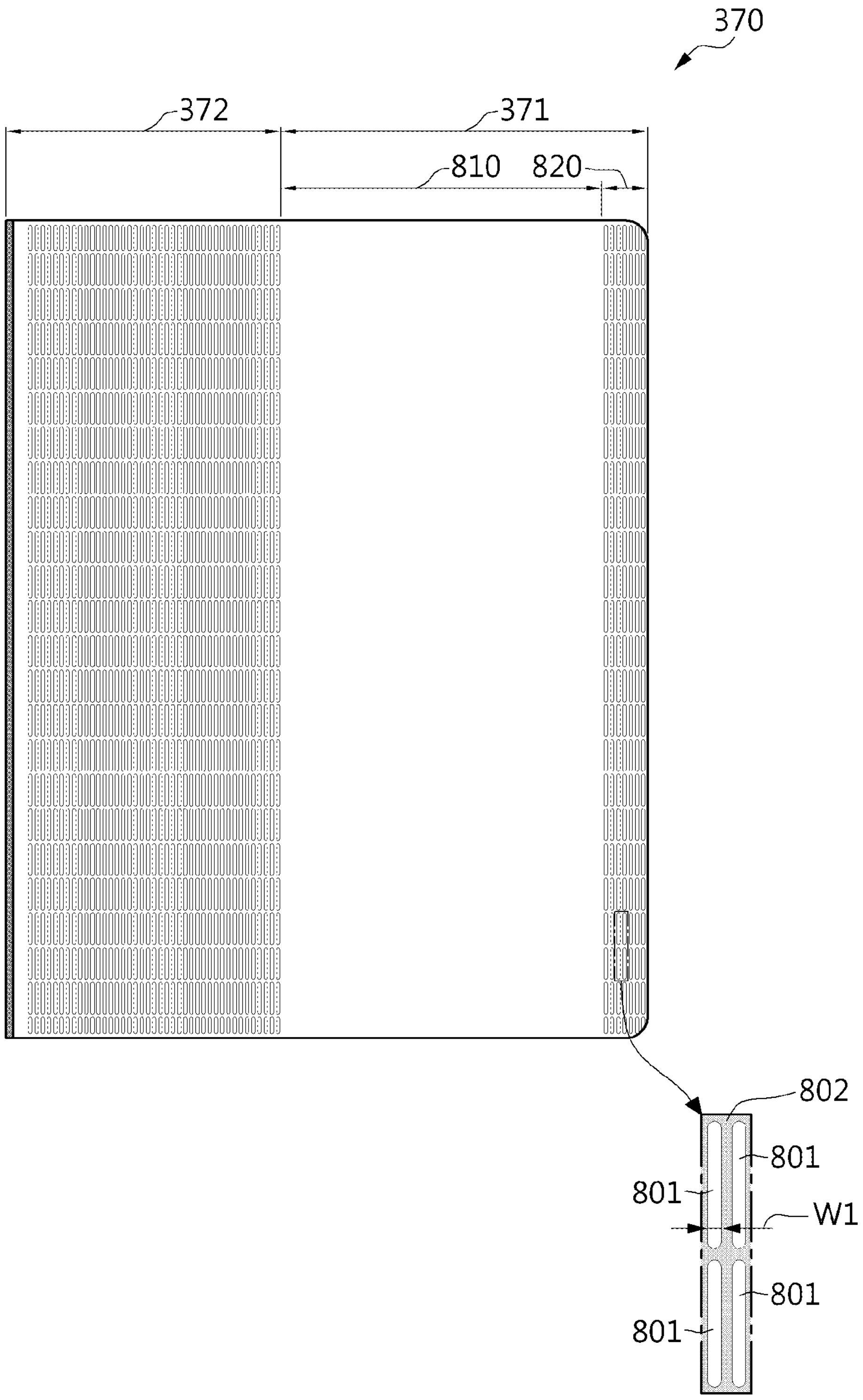
FIG. 8 is a diagram illustrating a support sheet in an unfolded state according to various embodiments.

FIG. 8 is a diagram illustrating the support sheet 370 in an unfolded state according to various embodiments.

Referring to FIGS. 6A, 7, and 8, in an embodiment, the support sheet 370 may include a first part 371 disposed along the first section ① of the flexible display 130, and a second part 372 extended from the first part 371 and disposed along the bendable section ③ (see FIG. 3, 4, 5, or 6A) of the flexible display 130. The first part 371 may include a first flat section 810 disposed along the flat part 130*a* and a first bending section 820 disposed along the first curved part 130*b*. The first bending section 820 may include a lattice structure 802 including a plurality of openings (or a plurality of slits) 801. For example, the plurality of openings 801 may be formed periodically, have substantially the same shape, and be repeatedly arranged at regular intervals. The display assembly 700 may be disposed and supported at the sliding plate 120 of FIG. 3, 4, or 5; thus, the flat part 130*a* and the first curved part 130*b* of the screen (e.g., the screen 1301 of FIG. 1A or 2A) may be formed. According to an embodiment, the bending part 790 of the display assembly 700 may be bent along the curved part 121 of the sliding plate 120 to be disposed at the curved part 121; thus, the first curved part 130*b* of the screen may be formed. The support sheet 370 may provide elasticity (or elastic restoring force) to restore the bending part 790 to an unfolded state, but the first bending section 820 may be more flexible than the first flat section 810 because of the lattice structure 802, and contribute to flexibility of the bending part 790. When flexibility of the bending part 790 is secured, the bending part 790 may be easily attached to the curved part 121 of the sliding plate 120. According to various embodiments (not illustrated), the lattice structure 802 of the first bending section 820 is not limited to the embodiment of FIG. 8 and may be implemented in various other forms. According to various embodiments, the support sheet 370 may include a recess pattern (not illustrated) including a plurality of recesses in place of a lattice structure, and the recess pattern may contribute to flexibility of the flexible display 130. According to various embodiments, the lattice structure or the recess pattern may be extended to and disposed in at least a part of the flat part 130*a* of the screen. According to various embodiments, the support sheet 370 including a lattice structure or a recess pattern may be formed in a plurality of layers.

According to an embodiment, the second part 372 of the support sheet 370 may be positioned opposite to the first bending section 820 with the first flat section 810 therebetween. The second part 372 may include a lattice structure including a plurality of openings (or a plurality of slits). The support sheet 370 may provide elasticity (or elastic restoring force) to restore the bendable section ③ (see FIG. 3, 4, 5, or 6A) of the flexible display 130 to the unfolded state, but the second part 372 may be more flexible than the first flat section 810 of the first part 371 because of the lattice structure, and contribute to flexibility of the bendable section ③. According to various embodiments, a recess pattern including a plurality of recesses in place of the lattice structure may be provided.

According to an embodiment, the lattice structure of the second part 372 may be implemented in substantially the same shape as that of the lattice structure 802 included in the first bending section 820 of the first part 371. According to various embodiments, the lattice structure 802 included in the first bending section 820 of the first part 371 may be implemented in a form at least partially different from the lattice structure of the second part 372.

According to various embodiments, a shape (e.g., width) of the plurality of openings 801 included in the lattice structure 802 of the first bending section 820 or an arrangement interval thereof may be variously implemented according to a curvature or a radius of curvature of the first bending section 820. According to various embodiments, a shape of the plurality of openings included in the lattice structure of the second part 372 or an arrangement interval thereof may be variously implemented according to the curvature or radius of curvature of the second part 372.

According to an embodiment, when the folding section ④ included in the second section ② is bent, a radius of curvature R thereof may be a value capable of reducing the stress generated in the folding section ④ because of bending. The folding section ④ may be, for example, bent with a minimized/reduced radius of curvature R while preventing and/or reducing damage to the folding section ④ by reducing stress that may occur because of bending. The minimized/reduced radius of curvature R may contribute to slimming of the display assembly 700 (e.g., minimizing and/or reducing the separation distance between the first section ① and the bonding section ⑤ of the second section ②).

According to an embodiment, the spacer 740 may be positioned at least partially between the support sheet 370 and the bonding section ⑤ of the second section ②. The spacer 740 may be disposed in a space (not illustrated) between the support sheet 370 and the second part 622 of the base film 620 to reduce the stress of the folding section ④ while enabling the folding section ④ to be disposed in a curved state with a corresponding radius of curvature R. The spacer 740 may include, for example, a non-metallic material (e.g., polymer) and/or a metallic material.

The display panel 610 and/or the lower panel 630 may have a thickness of, for example, about 30 μm (micrometer). According to an embodiment, in order to minimize/reduce the stress generated in a part of the extension part 614 of the display panel 610 positioned in the folding section ④, the radius of curvature R of the folding section ④ may be about 300 μm, and a gap D between the display panel 610 and a part of the extension part 614 positioned in the bonding section ⑤ may be about 600 μm. The first part 621 and/or the second part 622 of the base film 620 may have a thickness of about 50 μm. The support sheet 370, the spacer 740, and/or the lower panel 630 may be formed in a thickness capable of maintaining a gap D.

According to various embodiments (not illustrated), the support sheet 370 and the second part 622 of the base film 620 may be bonded to each other through a polymer adhesive member (not illustrated) without the spacer 740. In this case, the adhesive member may be formed in a thickness capable of reducing the stress of the folding section ④ while enabling the folding section ④ of the second section ② to be curved with a corresponding radius of curvature R.

Referring to FIGS. 6, 7, and 8, in an embodiment, the spacer 740 may include a second flat section 830 interposed between the support sheet 370 and the second part 622 of the base film 620 corresponding to the flat part 130*a* of the screen and a second bending section 840 disposed along the first curved part 130*b* of the screen. The second bending section 840 may be extended along the first bending section 820 of the support sheet 370. The second bending section 840 may include a plurality of openings 803. A lattice structure of the second bending section 840 may be formed, for example, at least partially similar to or identical to the lattice structure of the first bending section 820. The spacer 740 may provide elasticity (or elastic restoring force) to restore the bending part 790 of the display assembly 700 to an unfolded state, but the second bending section 840 may be more flexible than the second flat section 830 because of the lattice structure and contribute to flexibility of the bending part 790. When flexibility of the bending part 790 is secured, the bending part 790 may be easily attached to the curved part 121 of the sliding plate 120.

When the first bending section 820 of the support sheet 370 is bent and disposed in the bending part 790, stress may be concentrated at a boundary part between the first flat section 810 and the first bending section 820; thus, there is a possibility that damage (e.g., breakage) of the support sheet 370 may occur. According to an embodiment, the lattice structure of the support sheet 370 may be further extended to and disposed in at least a part of the first flat section 810. For example, the lattice structure of the support sheet 370 may be further extended to and disposed in at least a part of the first flat section 810, as in an opening illustrated by reference numeral 801*a*.

When the second bending section 840 of the spacer 740 is bent and disposed in the bending part 790, stress may be concentrated in a boundary part between the second flat section 830 and the second bending section 840; thus, there is a possibility that damage (e.g., breakage) of the spacer 740 may occur. According to an embodiment, the lattice structure of the spacer 740 may be further extended to at least a part of the second flat section 830. For example, the lattice structure of the spacer 740 may be further extended to and disposed in at least a part of the second flat section 830, as in an opening illustrated by reference numeral 803*a*.

According to various embodiments, a plurality of openings 801 included in the first bending section 820 of the support sheet 370 and a plurality of openings 803 included in the second bending section 840 of the spacer 740 may be disposed to overlap at least partially. This may contribute to flexibility of the bending part 790.

According to an embodiment, the plurality of openings 801 included in the first bending section 820 may have a first width W1 (see FIGS. 7 and 8) extended along a curve (not illustrated) of the first curved part 130*b*. The second bending section 840 may be positioned further inside than the first bending section 820, and the plurality of openings 803 included in the second bending section 840 may have a second width W2 extended along a curved line of the first curved part 130*b* of the screen. According to an embodiment, the second width W2 may be larger than the first width W1, which may contribute to flexibility of the bending part 790.

Figure 9:
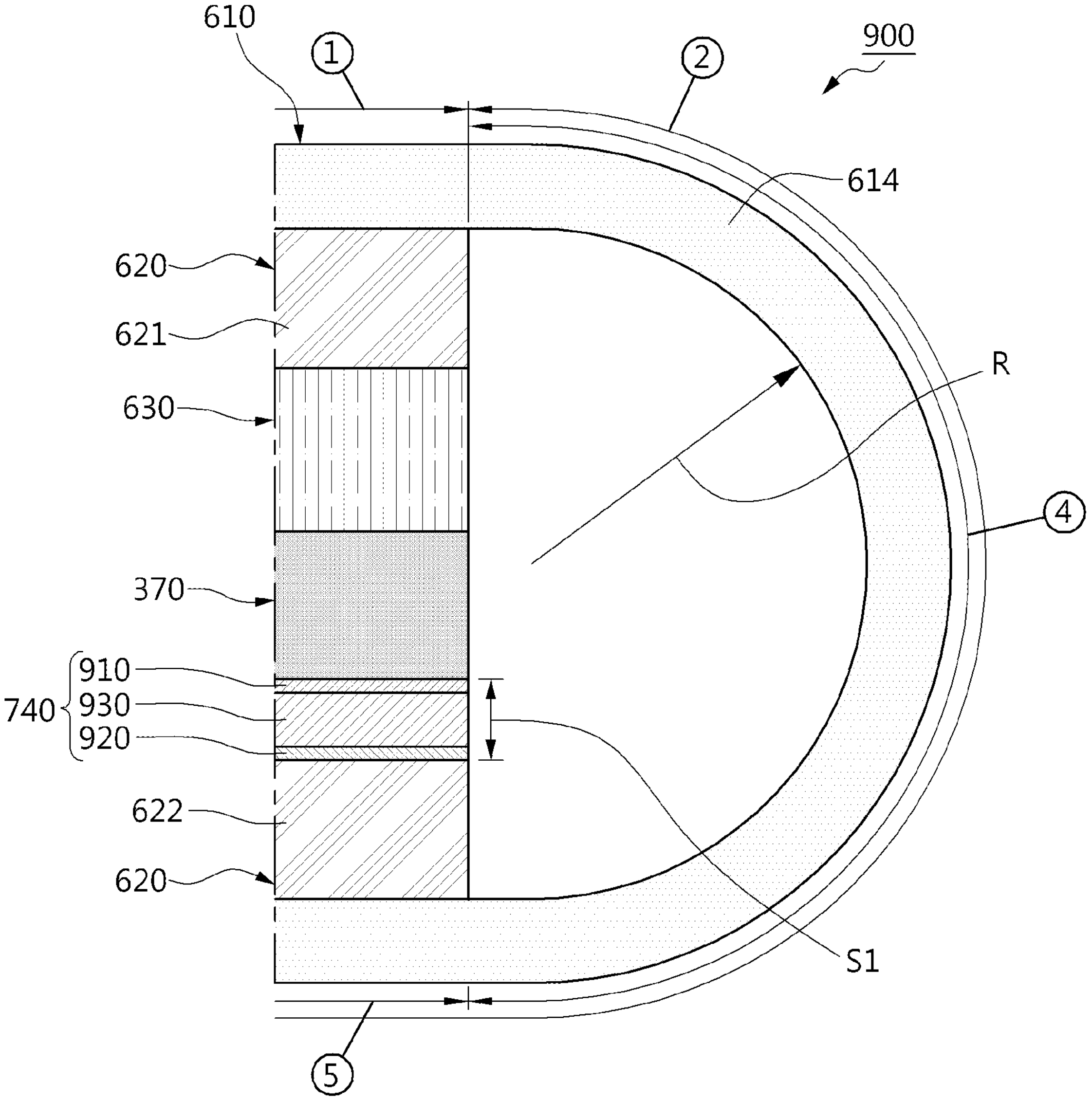
FIG. 9 is a cross-sectional view illustrating a part of a display assembly according to various embodiments.

FIG. 9 is a cross-sectional view illustrating a part of a display assembly 900 according to various embodiments.

Referring to FIG. 9, in an embodiment, the display assembly 900 may include a display panel 610, a base film 620, a lower panel 630, a support sheet 370, and/or a spacer 740. A part (not illustrated) of the display panel 610 other than an extension part 614, a first part 621 of the base film 620, the lower panel 630, and the support sheet 370 may be positioned at a first section ①. The extension part 614 of the display panel 610 and a second part 622 of the base film 620 may be positioned at the second section ②. The second section ② may include a folding section ④ and a bonding section ⑤. The second part 622 of the base film 620 may be positioned at the bonding section ⑤. Redundant descriptions of some of reference numerals of FIG. 9 may not be repeated. Although not illustrated, the display assembly 900 of FIG. 9 may further include various components not illustrated (e.g., the transparent cover 710, the optical transparent adhesive member 720, the optical layer 730, the display driving circuit 640, or the FPCB 137 of FIG. 7).

According to an embodiment, the spacer 740 may include a polymer film 930, a first adhesive member 910, and/or a second adhesive member 920. The polymer film 930 may be, for example, a polyester (PET) film. The first adhesive member 910 may be disposed between the polymer film 930 and the support sheet 370. The second adhesive member 920 may be disposed between the polymer film 930 and the second part 622 of the base film 620. The first adhesive member 910 and/or the second adhesive member 920 may include adhesive materials of various polymers. The spacer 740 may be disposed in the space Si between the support sheet 370 and the second part 622 of the base film 620 to enable the folding section ④ to disposed in a bent state with a corresponding radius of curvature R, thereby reducing the stress of the folding section ④.

According to various embodiments, the polymer film 930 may include a material for heat dissipation or reinforcement for the display assembly 900.

According to various embodiments, a film made of a metallic material to replace the polymer film 930 may be disposed. For example, a film replacing the polymer film 930 may include a metal material for heat dissipation and/or reinforcement such as copper or a copper alloy. For example, a metal film replacing the polymer film 930 may include stainless steel for reinforcement. According to various embodiments, a metal film to replace the polymer film 930 may contribute to electromagnetic interference (EMI) shielding for the display assembly 900.

According to various embodiments, a plurality of films (not illustrated) including a non-metal material and/or a metal material in place of the polymer film 930 may be disposed.

According to an embodiment, the first adhesive member 910 and the second adhesive member 920 may have different thicknesses. According to various embodiments, the first adhesive member 910 and the second adhesive member 920 may have substantially the same thickness.

According to an embodiment, the first adhesive member 910 may be an adhesive member having a component different from that of the second adhesive member 920. According to various embodiments, the first adhesive member 910 may be an adhesive member having the same adhesive component as that of the second adhesive member 920.

Figure 10:
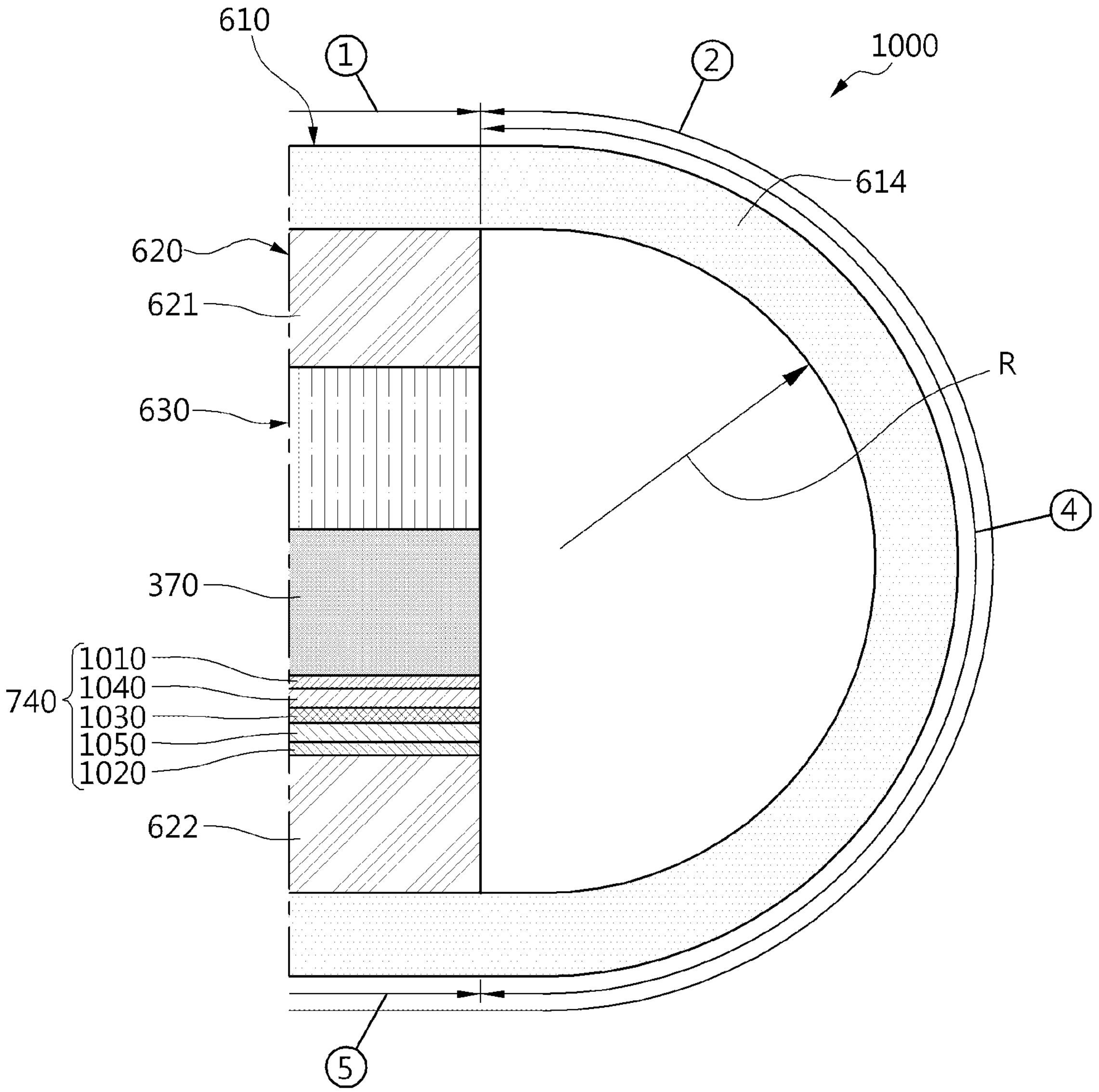
FIG. 10 is a cross-sectional view illustrating a part of a display assembly according to various embodiments.

FIG. 10 is a cross-sectional view illustrating a part of the display assembly 1000 according to various embodiments.

Referring to FIG. 10, in an embodiment, the display assembly 1000 may include a display panel 610, a base film 620, a lower panel 630, a support sheet 370, and/or a spacer 740. A part (not illustrated) of the display panel 610 other than the extension part 614, a first part 621 of the base film 620, the lower panel 630, and the support sheet 370 may be positioned in a first section ①. The extension part 614 of the display panel 610 and the second part 622 of the base film 620 may be positioned in the second section ②. The second section ② may include a folding section ④ and a bonding section ⑤. The second part 622 of the base film 620 may be positioned in the bonding section ⑤. Redundant descriptions of some of reference numerals of FIG. 10 may not be repeated. Although not illustrated, the display assembly 1000 of FIG. 10 may further include various components not illustrated (e.g., the transparent cover 710, the optical transparent adhesive member 720, the optical layer 730, the display driving circuit 640, or the FPCB 137 of FIG. 7).

According to an embodiment, the spacer 740 may include a first film 1030, a second film 1040, a third film 1050, a first adhesive member 1010 (e.g., the first adhesive member 910 of FIG. 9), and/or a second adhesive member 1020 (e.g., the second adhesive member 920 of FIG. 9). The first film 1030, the second film 1040, and the third film 1050 may be interposed between the first adhesive member 1010 and the second adhesive member 1020. The first film 1030 may be interposed between the second film 1040 and the third film 1050. The second film 1040 may be interposed between the first adhesive member 1010 and the first film 1030. The third film 1050 may be interposed between the second adhesive member 1020 and the first film 1030. According to various embodiments, an adhesive member may be disposed between the first film 1030 and the second film 1040 and/or between the second film 1040 and the third film 1050.

According to an embodiment, the first film 1030, the second film 1040, and/or the third film 1050 may include non-metallic materials and/or metal materials for heat dissipation and/or reinforcement for the display assembly 900. For example, the first film 1030 and/or the third film 1050 may include polyimide or polyester. For example, the second film 1040 may be interposed between the first film 1030 and the third film 1050 and include graphite. According to various embodiments, the first film 1030, the second film 1040, and/or the third film 1050 may include a non-metallic material and/or a metallic material. According to various embodiments, the number of films between the first adhesive member 1010 and the second adhesive member 1020 is not limited to the embodiment of FIG. 10 and may be various.

Figure 11:
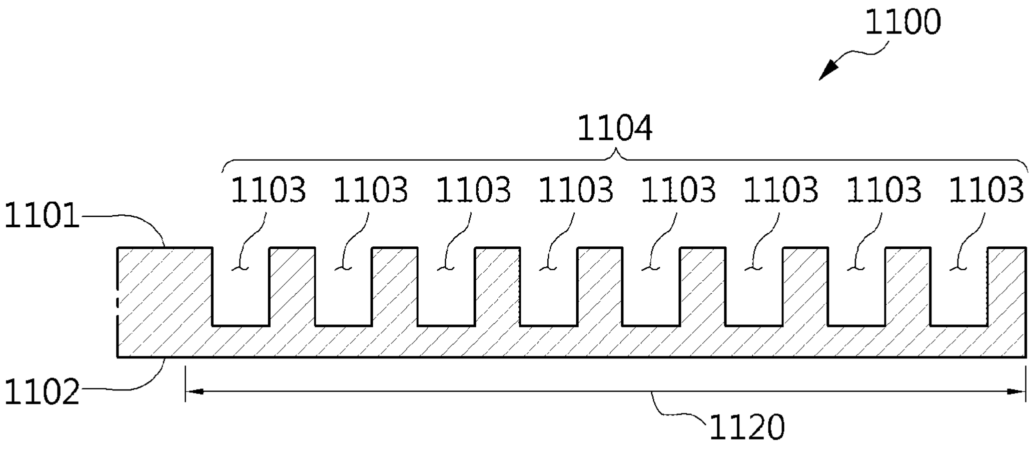
FIG. 11 is a cross-sectional view illustrating a support sheet according to various embodiments.

FIG. 11 is a cross-sectional view illustrating a support sheet 1100 according to various embodiments.

According to various embodiments, the support sheet 1100 according to the embodiment of FIG. 11 may be disposed in the display assembly 700 of FIG. 7 in place of the support sheet 370 of FIG. 7.

Referring to FIG. 11, in an embodiment, the support sheet 1100 may include a first bending section 1120 disposed along the first curved part **130*b* of FIG. 7. The support sheet 1100 may include one surface 1101 and the other surface 1102 positioned opposite each other. According to an embodiment, the support sheet 1100 may include a recess pattern 1104 including a plurality of recesses (or grooves) 1103 formed in one surface 1101 in the first bending section 1120. The recess pattern 1104 may be disposed along the curve of the first curved part 130*b* of FIG. 7. The support sheet 1100 may provide elasticity (or elastic restoring force) to restore the bending part 790 of FIG. 7 to an unfolded state, and the first bending section 1120 including the recess pattern 1104 may contribute to flexibility of the bending part 790**.

According to an embodiment, one surface 1101 including the recess pattern 1104 may face the lower panel 630 of FIG. 7, and the other surface 1102 may face the spacer 740 of FIG. 7. According to an embodiment, one surface 1101 including the recess pattern 1104 may face the spacer 740 of FIG. 7, and the other surface 1102 may face the lower panel 630 of FIG. 7.

According to various embodiments, a shape (e.g., width or depth) of the plurality of recesses 1103 included in the recess pattern 1104 or an arrangement interval thereof may be variously implemented according to the curvature of the first bending section 1120.

According to various embodiments, a recess pattern may be formed at the other surface 1102 of the support sheet 1100.

According to various embodiments, the recess pattern 1104 may be extended to and disposed in at least a part of the flat part **130*a* (see FIG. 7**) of the screen.

Figure 12:
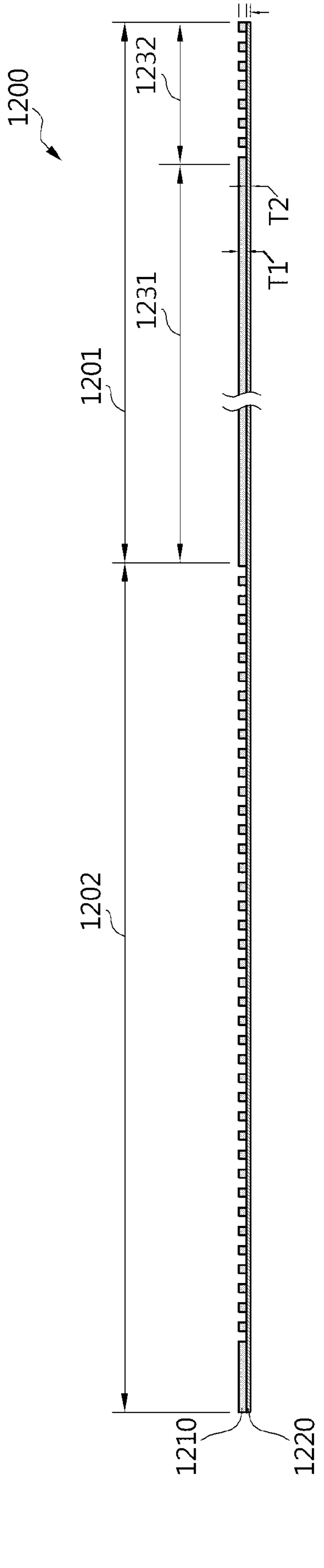
FIG. 12 is a cross-sectional view illustrating a first support sheet and a second support sheet according to various embodiments.

FIG. 12 is a cross-sectional view 1200 illustrating a first support sheet 1210 and a second support sheet 1220 according to various embodiments.

Referring to FIG. 12, in an embodiment, the first support sheet 1210 may be substantially the same as the support sheet 370 of FIG. 7. For example, the first support sheet 1210 may include a first part 1201 (e.g., the first part 371 of FIG. 8) disposed along the first section ① of the flexible display 130 illustrated in FIG. 7 and a second part 1202 (e.g., the second part 372 of FIG. 8) extended from the first part 1201 and disposed along the bendable section ③ (see FIG. 3, 4, 5, or 6) of the flexible display 130. The first part 1201 may include a first flat section 1231 (e.g., the first flat section 810 of FIG. 8) disposed along the flat part **130*a* of FIG. 7 and a first bending section 1232 (e.g., the first bending section 820 of FIG. 8) disposed along the first curved part 130*b* of FIG. 7. The first bending section 1232 and the second part 1202 may include a lattice structure (e.g., the lattice structure 802 of FIG. 8**) including a plurality of openings.

According to an embodiment, the second support sheet 1220 may be at least partially disposed along the first support sheet 1210. The first support sheet 1210 and the second support sheet 1220 according to the embodiment of FIG. 12 may be disposed in the display assembly 700 of FIG. 7 in place of the support sheet 370 of FIG. 7. For example, the second support sheet 1220 may be positioned to be spaced apart from the lower panel 630 of FIG. 7 with the first support sheet 1210 interposed therebetween. For another example, the first support sheet 1210 may be positioned to be spaced apart from the lower panel 630 of FIG. 7 with the second support sheet 1220 interposed therebetween.

According to an embodiment, the second support sheet 1220 may reinforce the first support sheet 1210. For example, when a tensile force acts in the first support sheet 1210, the first flat section 1231 of the first support sheet 1210 does not extend, but the second part 1202 and/or the first bending section 1232 of the first support sheet 1210 may be elongated because of the lattice structure. The second support sheet 1220 may prevent and/or reduce elongation of the second part 1202 and/or the first bending section 1232 of the first support sheet 1210. The second support sheet 1220 may have a thickness capable of reinforcing the first support sheet 1210 while minimizing and/or reducing elasticity (or elastic restoring force) to restore the bending part 790 of FIG. 7 to an unfolded state. The second support sheet 1220 may have a thickness capable of reinforcing the first support sheet 1210 without reducing flexibility of the bending part 790 of FIG. 7. According to an embodiment, a second thickness T2 of the second support sheet 1220 may be smaller than a first thickness T1 of the first support sheet 1210.

According to an embodiment, the thickness of the second support sheet 1220 may be substantially constant. According to various embodiments, the thickness of the second support sheet 1220 may be partially different. For example, a part of the second support sheet 1220 may be disposed corresponding to the second part 1202 and/or the first bending section 1232 of the first support sheet 1210 including a lattice structure, and have a relatively thin thickness. According to various embodiments, the second support sheet 1220 may be disposed to correspond to a part of the first support sheet 1210 (e.g., at least a part of the first part 1201 or the second part 1202).

According to an embodiment, the first support sheet 1210 and/or the second support sheet 1220 may include a metallic material and/or a non-metal material. For example, the first support sheet 1210 and/or the second support sheet 1220 may include stainless steel. For another example, the first support sheet 1210 and/or the second support sheet 1220 may include engineering plastics.

According to various embodiments, the second support sheet 1220 may serve to diffuse, disperse, or radiate heat. The second part 1202 and/or the first bending section 1232 of the first support sheet 1210 may be difficult to diffuse, disperse, or dissipate heat compared with the first flat section 1231 of the first support sheet 1210 because of the lattice structure including a plurality of openings. The second support sheet 1220 may supplement a heat conduction performance of the first support sheet 1210.

Figure 13:
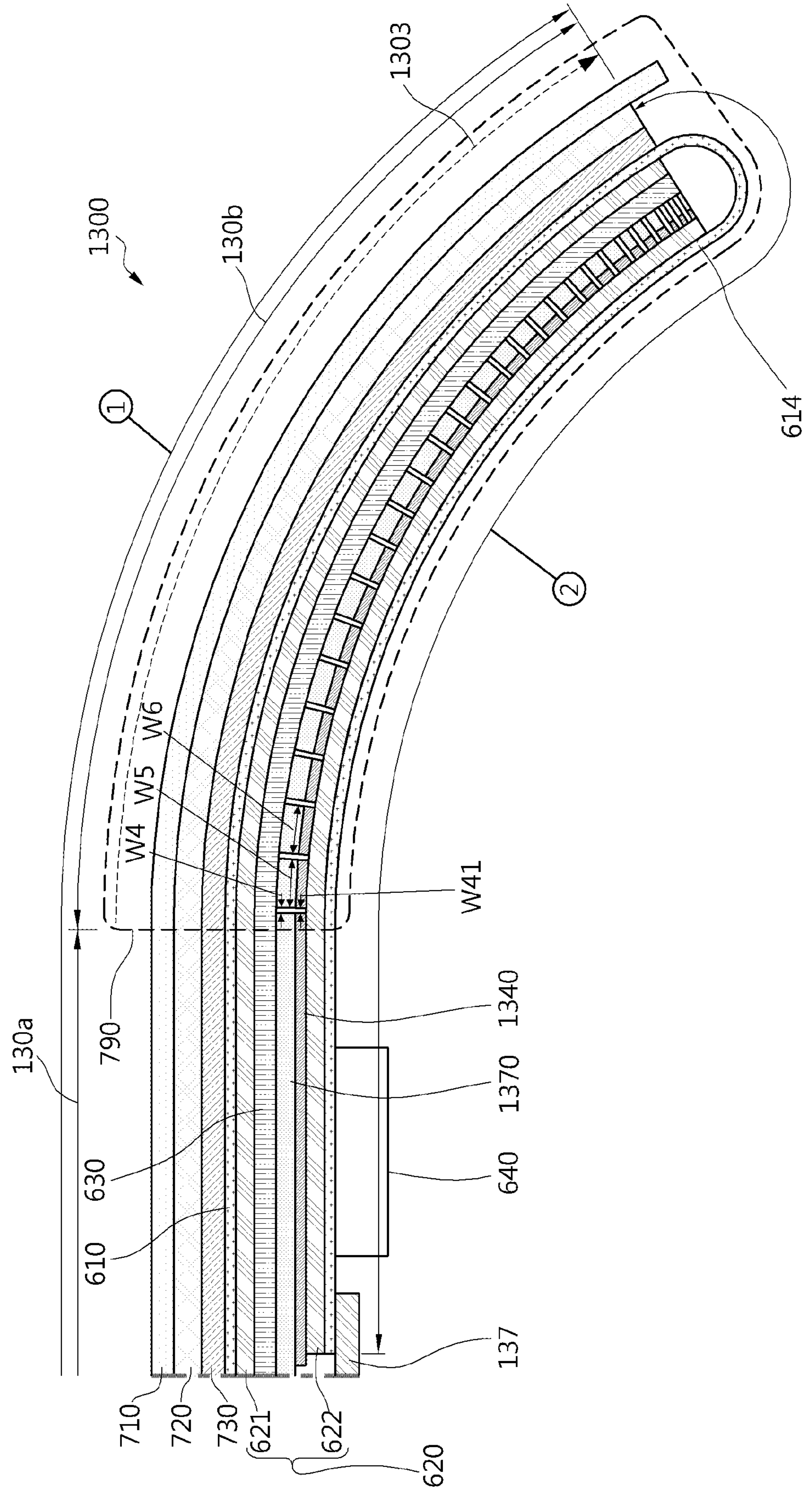
FIG. 13 is a cross-sectional view illustrating a part of a display assembly according to various embodiments.

FIG. 13 is a cross-sectional view illustrating a part of a display assembly 1300 according to various embodiments.

Referring to FIG. 13, in an embodiment, the display assembly 1300 may include a display panel 610, a base film 620, a lower panel 630, a display driving circuit 640, a FPCB 137, a transparent cover 710, an optical transparent adhesive member 720, an optical layer 730, a support sheet 1370, and/or a spacer 1340. The base film 620 may include a first part 621 positioned in the first section ① of the flexible display 130 and a second section 622 positioned in the second section ② of the flexible display 130. Redundant descriptions of some of reference numerals of FIG. 13 may not be repeated.

According to an embodiment, a bending part 790 of the display assembly 1300 may have an irregular radius of curvature along a curve (see reference numeral 1303) of a first curved part 130*b*. For example, a radius of curvature of the bending part 790 may decrease as a distance from a flat part 130*a* increases. According to an embodiment, the support sheet 1370 may include an opening pattern (or lattice structure) including a plurality of openings formed in the bending part 790, and a width W4 of the plurality of openings extended along the curve 1303 of the first curved part 130*b* may be substantially constant. According to an embodiment, the support sheet 1370 may include parts between the plurality of openings, and the width of the parts extended along the curve 1303 may decrease as a distance from the flat part 130*a* increases. For example, in the opening pattern of the support sheet 1370, a first part spaced apart from the flat part 130*a* by a first distance along the curve 1303 may correspond to a first radius of curvature of the bending part 790, and be extended along the curve 1303 to have a first width W5. In the opening pattern of the support sheet 1370, a second part spaced apart from the flat part 130*a* by a second distance greater than the first distance along the curve 1303 may correspond to a second radius of curvature smaller than the first radius of curvature and be extended to have a second width W6 smaller than the first width W5 along the curve 1303.

According to various embodiments (not illustrated), parts between the plurality of openings included in the opening pattern of the support sheet 1370 may be implemented into substantially the same width along the curve 1303 of the first curved part 130*b*.

According to an embodiment, the spacer 1340 may include an opening pattern overlapping at least partially with the opening pattern of the support sheet 1370. For this reason, when the bending part 790 is bent and disposed so that the radius of curvature decreases as a distance from the flat part 130*a* increases, the support sheet 1370 and the spacer 1340 may contribute to flexibility that enables the bending part 790 to bend smoothly. According to an embodiment, the spacer 1340 may include an opening pattern formed in a shape substantially similar to or the same shape as the support sheet 1370. For example, the plurality of openings included in the opening pattern of the spacer 1340 may be overlapped with the same width (e.g., a width W41 extended along the curve 1303) as that of the plurality of openings included in the opening pattern of the support sheet 1370. For example, parts between the plurality of openings included in the opening pattern of the spacer 1340 may be overlapped with the same width (e.g., the same width extended along the curve 1303) as that of parts between the plurality of openings included in the opening pattern of the support sheet 1370.

When the bending part 790 is bent and disposed with respect to the flat part 130*a*, stress may be concentrated at a boundary part between the flat part 130*a* and the first curved part 130*b*; thus, there is a possibility that damage (e.g., breakage) of the support sheet 1370 and/or the spacer 1340 may occur to correspond to the boundary part. According to various embodiments (not illustrated), the opening pattern of the support sheet 1370 or the opening pattern of the spacer 1340 may be extended to and disposed in at least a part of the flat part 130*a* of the screen, thereby reducing stress concentrated to the boundary part.

According to an embodiment (not illustrated), the opening pattern of the spacer 1340 may be formed at least partially different from the opening pattern of the support sheet 1370. For example, a plurality of openings included in the opening pattern of the spacer 1340 and a plurality of openings included in the opening pattern of the support sheet 1370 may be aligned with each other, but may be extended in different widths along the curve 1303 (e.g., W41>W4 or W41<W4). For example, parts between a plurality of openings included in the opening pattern of the spacer 1340 and parts between the plurality of openings included in the opening pattern of the support sheet 1370 may be aligned with each other, but may be extended to have different widths along the curve 1303. The opening pattern of the spacer 1340 and the opening pattern of the support sheet 1370 may be at least partially implemented into other different shapes.

According to various embodiments (not illustrated), at least one of the opening pattern of the support sheet 1370 and the opening pattern of the spacer 1340 may be replaced with the recess pattern (e.g., the recess pattern 1104 of FIG. 11) including a plurality of recesses. When the opening pattern of the support sheet 1370 is replaced with the recess pattern, the recess pattern may be formed at one surface of the support sheet 1370 facing the lower panel 630 and/or the other surface of the support sheet 1370 facing the spacer 1340. When the opening pattern of the spacer 1340 is replaced with the recess pattern, the recess pattern may be formed at one surface of the spacer 1340 facing the second part 622 of the base film 620 and/or the other surface of the spacer 1340 facing the support sheet 1370.

According to various embodiments (not illustrated), the opening pattern of the support sheet 1370 or the opening pattern of the spacer 1340 may be omitted.

Figure 14:
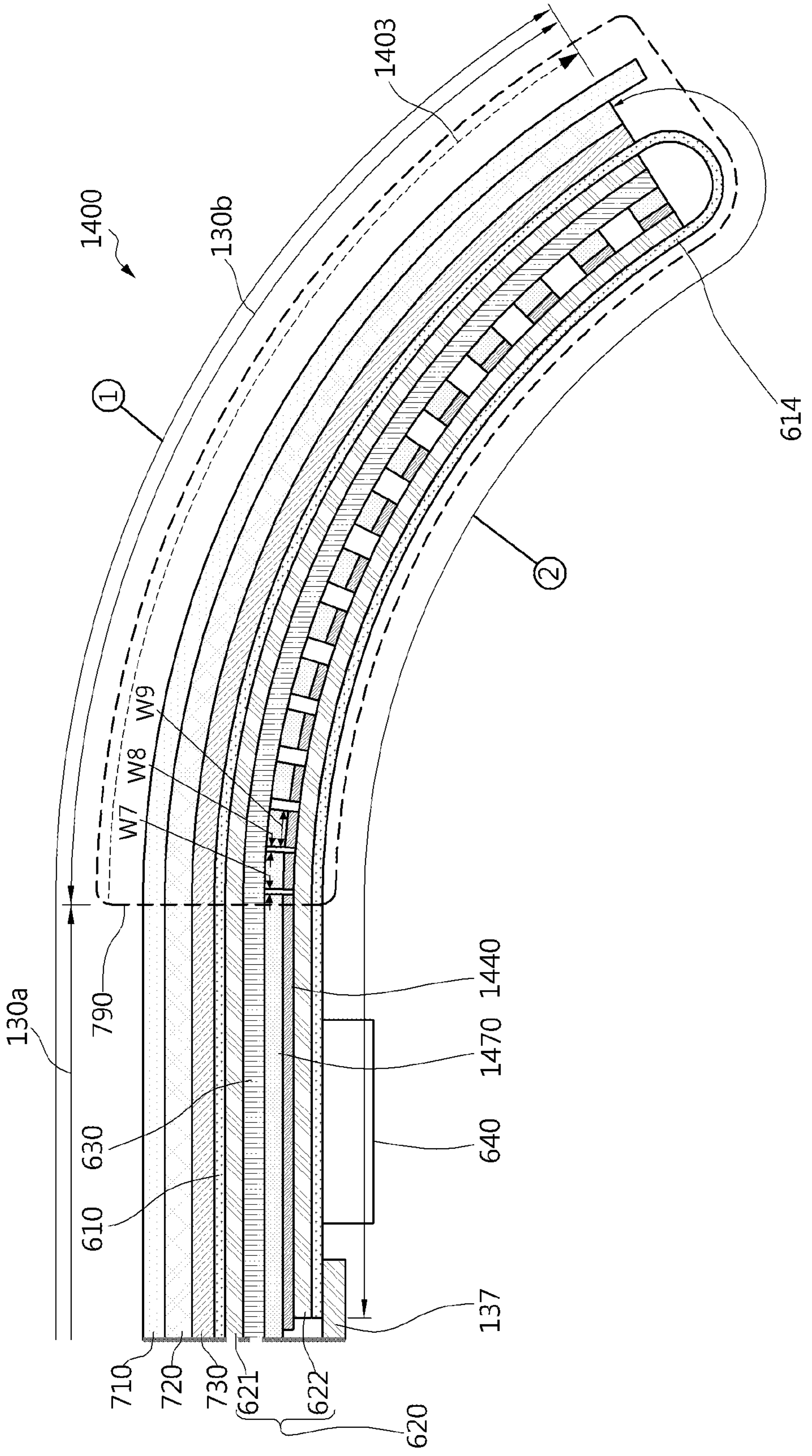
FIG. 14 is a cross-sectional view illustrating a part of a display assembly according to various embodiments.

FIG. 14 is a cross-sectional view illustrating a part of a display assembly 1400 according to various embodiments.

Referring to FIG. 14, in an embodiment, the display assembly 1400 may include a display panel 610, a base film 620, a lower panel 630, a display driving circuit 640, a FPCB 137, a transparent cover 710, an optical transparent adhesive member 720, an optical layer 730, a support sheet 1470, and/or a spacer 1440. The base film 620 may include a first part 621 positioned in the first section ① of the flexible display 130 and a second section 622 positioned in the second section ② of the flexible display 130. Redundant descriptions of some of reference numerals of FIG. 14 may not be repeated.

According to an embodiment, a radius of curvature of a bending part 790 may decrease as a distance from a flat part 130*a* increases. According to an embodiment, the support sheet 1470 may include an opening pattern (or lattice structure) including a plurality of openings formed in the bending part 790, and the width of the plurality of openings extended along a curve 1403 of a first curved part 130*b* may increase as a distance from the flat part 130*a* increases. For example, in the opening pattern of the support sheet 1470, a first opening spaced apart from the flat part 130*a* by a first distance along the curve 1403 may correspond to a first radius of curvature of the bending part 790, and be extended to have a first width W7 along the curve 1403. In the opening pattern of the support sheet 1470, a second opening spaced apart from the flat part 130*a* along the curve 1403 by a second distance greater than the first distance may correspond to a second radius of curvature smaller than a first radius of curvature and be extended along the curve 1403 to have a second width W8 larger than the first width W7. According to an embodiment, the support sheet 1470 may include parts between a plurality of openings, and a width W9 in which the parts are extended along the curve 1403 may be substantially constant.

According to an embodiment, the spacer 1440 may include an opening pattern overlapping at least partially with the opening pattern of the support sheet 1470. For this reason, when the bending part 790 is bent and disposed so that a radius of curvature decreases as a distance from the flat part 130*a* increases, the support sheet 1470 and the spacer 1440 may contribute to flexibility that enables the bending part 790 to bend smoothly. According to an embodiment, the spacer 1440 may include an opening pattern formed in a shape substantially similar to or the same shape as the support sheet 1470. For example, the plurality of openings included in the opening pattern of the spacer 1440 may be overlapped with the same width (e.g., the same width extended along the curve 1403) as that of the plurality of openings included in the opening pattern of the support sheet 1470. For example, parts between the plurality of openings included in the opening pattern of the spacer 1440 may be overlapped with the same width (e.g., the same width extended along the curve 1403) as that of parts between the plurality of openings included in the opening pattern of the support sheet 1470.

When the bending part 790 is bent and disposed with respect to the flat part 130*a*, stress may be concentrated at a boundary part between the flat part 130*a* and the first curved part 130*b*; thus, there is a possibility that damage (e.g., breakage) of the support sheet 1470 and/or the spacer 1440 may occur to correspond to the boundary part. According to various embodiments (not illustrated), the opening pattern of the support sheet 1470 or the opening pattern of the spacer 1440 may be extended to and disposed in at least a part of the flat part 130*a* of the screen, thereby reducing stress concentrated to the boundary part.

According to an embodiment (not illustrated), the opening pattern of the spacer 1440 may be formed at least partially different from the opening pattern of the support sheet 1470. For example, a plurality of openings included in the opening pattern of the spacer 1440 and a plurality of openings included in the opening pattern of the support sheet 1470 may be aligned with each other, but may be extended in different widths along the curve 1403. For example, parts between a plurality of openings included in the opening pattern of the spacer 1440 and parts between the plurality of openings included in the opening pattern of the support sheet 1470 may be aligned with each other, but may be extended to have different widths along the curve 1403. The opening pattern of the spacer 1440 and the opening pattern of the support sheet 1470 may be at least partially implemented into other different shapes.

According to various embodiments (not illustrated), at least one of the opening pattern of the support sheet 1470 and the opening pattern of the spacer 1440 may be replaced with the recess pattern (e.g., the recess pattern 1104 of FIG. 11) including a plurality of recesses. When the opening pattern of the support sheet 1470 is replaced with the recess pattern, the recess pattern may be formed in one surface of the support sheet 1470 facing the lower panel 630 and/or the other surface of the support sheet 1470 facing the spacer 1440. When the opening pattern of the spacer 1440 is replaced with the recess pattern, the recess pattern may be formed in one surface of the spacer 1440 facing the second part 622 of the base film 620 and/or the other surface of the spacer 1440 facing the support sheet 1470.

According to various embodiments (not illustrated), the opening pattern of the support sheet 1470 or the opening pattern of the spacer 1440 may be omitted.

Figure 15:
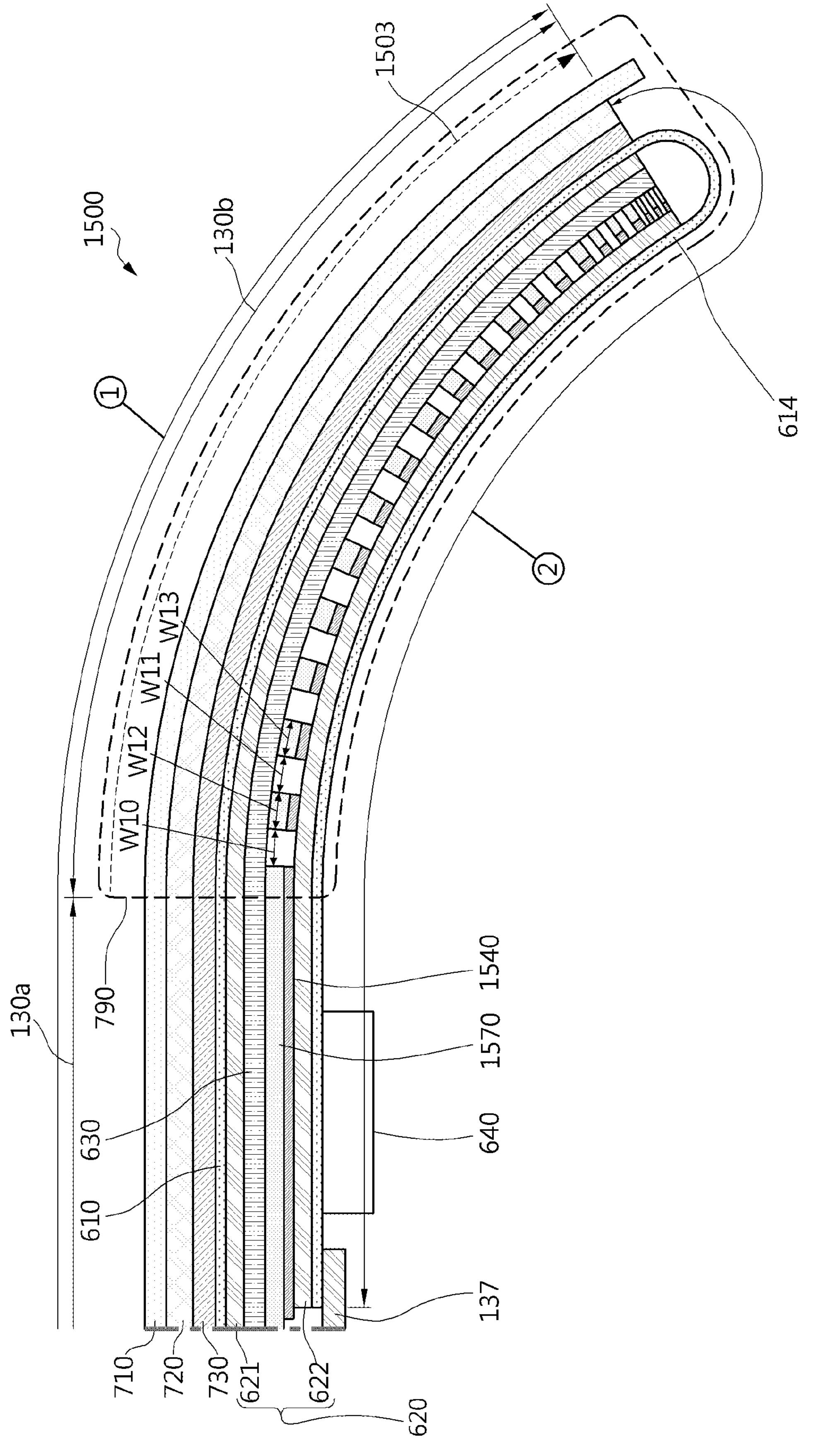
FIG. 15 is a cross-sectional view illustrating a part of a display assembly according to various embodiments.

FIG. 15 is a cross-sectional view illustrating a part of a display assembly 1500 according to various embodiments.

Referring to FIG. 15, in an embodiment, the display assembly 1500 may include a display panel 610, a base film 620, a lower panel 630, a display driving circuit 640, a FPCB 137, a transparent cover 710, an optical transparent adhesive member 720, an optical layer 730, a support sheet 1570, and/or a spacer 1540. The base film 620 may include a first part 621 positioned in the first section ① of the flexible display 130 and a second section 622 positioned in the second section ② of the flexible display 130. Redundant descriptions of some of reference numerals of FIG. 15 may not be repeated.

According to an embodiment, a radius of curvature of a bending part 790 may decrease as a distance from a flat part 130*a* increases. According to an embodiment, the support sheet 1570 may include an opening pattern (or lattice structure) including a plurality of openings formed in the bending part 790, and a width of the plurality of openings extended along a curve 1503 of a first curved part 130*b* may decrease as a distance from the flat part 130*a* increases. For example, in the opening pattern of the support sheet 1570, a first opening spaced apart from the flat part 130*a* by a first distance along the curve 1503 may correspond to a first radius of curvature of the bending part 790, and be extended to have a first width W10 along the curve 1503. In the opening pattern of the support sheet 1570, a second opening spaced apart from the flat part 130*a* along the curve 1503 by a second distance greater than the first distance may correspond to a second radius of curvature smaller than the first radius of curvature and be extended to have a second width W11 smaller than the first width W10 along the curve 1503.

According to an embodiment, the support sheet 1570 may include parts between a plurality of openings, and a width of the parts extended along the curve 1503 may decrease as a distance from the flat part 130*a* increases. For example, in the opening pattern of the support sheet 1570, a third part spaced apart from the flat part 130*a* along the curve 1503 by a third distance may correspond to a third radius of curvature of the bending part 790, and be extended to have a third width W12 along the curve 1503. In the opening pattern of the support sheet 1570, a fourth part spaced apart from the flat part 130*a* by a fourth distance greater than the third distance along the curve 1503 may correspond to a fourth radius curvature smaller than the third radius of curvature and be extended to have a fourth width W13 smaller than the third width W12 along the curve 1503.

According to an embodiment, the spacer 1540 may include an opening pattern overlapping at least partially with the opening pattern of the support sheet 1570. For this reason, when the bending part 790 is bent and disposed so that a radius of curvature decreases as a distance from the flat part 130*a* increases, the support sheet 1570 and the spacer 1540 may contribute to flexibility that enables the bending part 790 to smoothly bend. According to an embodiment, the spacer 1540 may include an opening pattern formed in a shape substantially similar to or the same shape as the support sheet 1570. For example, the plurality of openings included in the opening pattern of the spacer 1540 may be overlapped with the same width (e.g., the same width extended along the curve 1503) as that of the plurality of openings included in the opening pattern of the support sheet 1570. For example, parts between the plurality of openings included in the opening pattern of the spacer 1540 may be overlapped with the same width (e.g., a width extended along the curve 1503) as that of parts between the plurality of openings included in the opening pattern of the support sheet 1570.

When the bending part 790 is bent and disposed with respect to the flat part 130*a*, stress may be concentrated at a boundary part between the flat part 130*a* and the first curved part 130*b*; thus, there is a possibility that damage (e.g., breakage) of the support sheet 1570 and/or the spacer 1540 may occur to correspond to the boundary part. According to various embodiments (not illustrated), the opening pattern of the support sheet 1570 or the opening pattern of the spacer 1540 may be extended to and disposed in at least a part of the flat part 130*a* of the screen, thereby reducing stress concentrated to the boundary part.

According to an embodiment (not illustrated), the opening pattern of the spacer 1540 may be formed at least partially different from the opening pattern of the support sheet 1570. For example, a plurality of openings included in the opening pattern of the spacer 1540 and a plurality of openings included in the opening pattern of the support sheet 1570 may be aligned with each other, but may be extended in different widths along the curve 1503. For example, parts between a plurality of openings included in the opening pattern of the spacer 1540 and parts between the plurality of openings included in the opening pattern of the support sheet 1570 may be aligned with each other, but may be extended to have different widths along the curve 1503. The opening pattern of the spacer 1540 and the opening pattern of the support sheet 1570 may be at least partially implemented into other different shapes.

According to various embodiments (not illustrated), at least one of the opening pattern of the support sheet 1570 and the opening pattern of the spacer 1540 may be replaced with the recess pattern (e.g., the recess pattern 1104 of FIG. 11) including a plurality of recesses. When the opening pattern of the support sheet 1570 is replaced with the recess pattern, the recess pattern may be formed in one surface of the support sheet 1570 facing the lower panel 630 and/or the other surface of the support sheet 1570 facing the spacer 1540. When the opening pattern of the spacer 1540 is replaced with the recess pattern, the recess pattern may be formed in one surface of the spacer 1540 facing the second part 622 of the base film 620 and/or the other surface of the spacer 1540 facing the support sheet 1570.

According to various embodiments (not illustrated), the opening pattern of the support sheet 1570 or the opening pattern of the spacer 1540 may be omitted.

Figure 16:
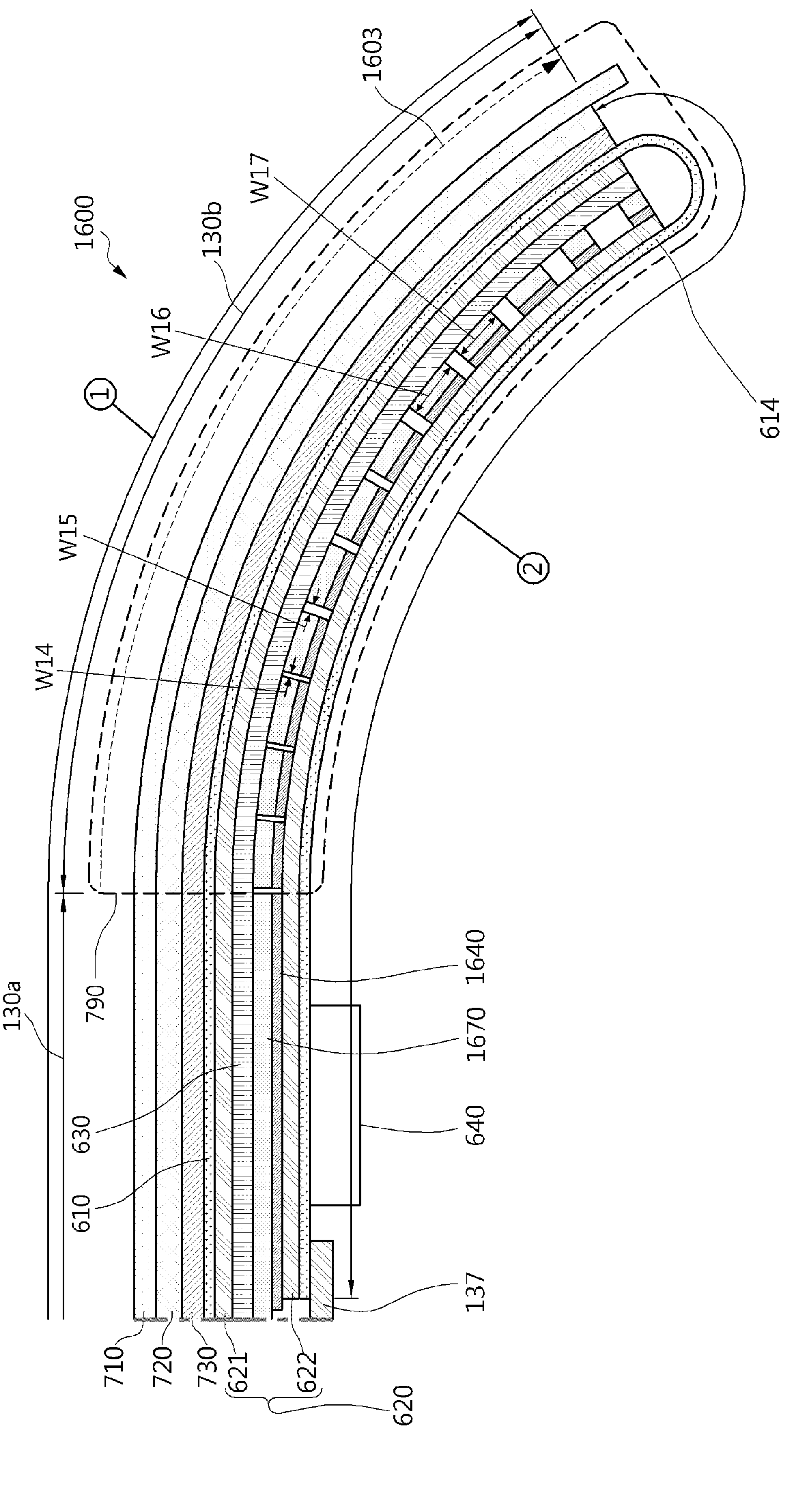
FIG. 16 is a cross-sectional view illustrating a part of a display assembly according to various embodiments

FIG. 16 is a cross-sectional view illustrating a part of a display assembly 1600 according to various embodiments.

Referring to FIG. 16, in an embodiment, the display assembly 1600 may include a display panel 610, a base film 620, a lower panel 630, a display driving circuit 640, a FPCB 137, a transparent cover 710, an optical transparent adhesive member 720, an optical layer 730, a support sheet 1670, and/or a spacer 1640. The base film 620 may include a first part 621 positioned in a first section ① of the flexible display 130 and a second section 622 positioned in a second section ② of the flexible display 130. Redundant descriptions of some of reference numerals of FIG. 16 may not be repeated.

According to an embodiment, a radius of curvature of a bending part 790 may decrease as a distance from a flat part 130*a* increases. According to an embodiment, the support sheet 1670 may include an opening pattern (or lattice structure) including a plurality of openings formed in the bending part 790, and a width of the plurality of openings extended along a curve 1603 of a first curved part 130*b* may increase as a distance from the flat part 130*a* increases. For example, in an opening pattern of the support sheet 1670, a first opening spaced apart from the flat part 130*a* by a first distance along the curve 1603 may correspond to a first radius of curvature of the bending part 790, and be extended to have a first width W14 along the curve 1603. In the opening pattern of the support sheet 1670, a second opening spaced apart from the flat part 130*a* along the curve 1603 by a second distance greater than the first distance may correspond to a second radius of curvature smaller than the first radius of curvature and be extended to have a second width W15 larger than the first width W14 along the curve 1603.

According to an embodiment, the support sheet 1670 may include parts between a plurality of openings, and the width of the parts extended along the curve 1603 may decrease as a distance from the flat part 130*a* increases. For example, in the opening pattern of the support sheet 1670, a third part spaced apart from the flat part 130*a* along the curve 1603 by a third distance may correspond to a third radius of curvature of the bending part 790, and be extended to have a third width W16 along the curve 1603. In the opening pattern of the support sheet 1670, a fourth part spaced apart from the flat part 130*a* by a fourth distance greater than the third distance along the curve 1603 may correspond to a fourth radius of curvature smaller than the third radius of curvature and be extended to have a fourth width W17 smaller than the third width W16 along the curve 1603.

According to an embodiment, the spacer 1640 may include an opening pattern overlapping at least partially with the opening pattern of the support sheet 1670. For this reason, when the bending part 790 is bent and disposed so that the radius of curvature decreases as a distance from the flat part 130*a* increases, the support sheet 1670 and the spacer 1640 may contribute to flexibility that enables the bending part 790 to smoothly bend. According to an embodiment, the spacer 1640 may include an opening pattern formed in a shape substantially similar to or the same shape as the support sheet 1670. For example, the plurality of openings included in the opening pattern of the spacer 1640 may be overlapped with the same width (e.g., the same width extended along the curve 1603) as that of the plurality of openings included in the opening pattern of the support sheet 1670. For example, parts between the plurality of openings included in the opening pattern of the spacer 1640 may be overlapped with the same width (e.g., a width extended along the curve 1603) as that of parts between the plurality of openings included in the opening pattern of the support sheet 1670.

According to various embodiments (not illustrated), the opening pattern of the support sheet 1670 and/or a plurality of openings included in the spacer 1640 and/or parts between the plurality of openings are not limited to those illustrated and may be formed in a different shape according to various embodiments. For example, a width of the plurality of openings extended along the curve 1603 of the first curved part 130*b* may decrease as a distance from the flat part 130*a* increases, and a width of parts between the plurality of openings extended along the curve 1603 may be substantially constant. For another example, the width of the plurality of openings extended along the curve 1603 of the first curved part 130*b* may decrease as a distance from the flat part 130*a* increases, and the width of the parts between the plurality of openings extended along the curve 1603 may increase as a distance from the flat part 130*a* increases.

When the bending part 790 is bent and disposed with respect to the flat part 130*a*, stress may be concentrated at a boundary part between the flat part 130*a* and the first curved part 130*b*; thus, there is a possibility that damage (e.g., breakage) of the support sheet 1670 and/or the spacer 1640 may occur to correspond to the boundary part. According to various embodiments (not illustrated), the opening pattern of the support sheet 1670 or the opening pattern of the spacer 1640 may be extended to and disposed in at least a part of the flat part 130*a* of the screen, thereby reducing stress concentrated to the boundary part.

According to an embodiment (not illustrated), the opening pattern of the spacer 1640 may be formed at least partially different from the opening pattern of the support sheet 1670. For example, a plurality of openings included in the opening pattern of the spacer 1640 and a plurality of openings included in the opening pattern of the support sheet 1670 may be aligned with each other, but may be extended to have different widths along the curve 1603. For example, parts between a plurality of openings included in the opening pattern of the spacer 1640 and parts between the plurality of openings included in the opening pattern of the support sheet 1670 may be aligned with each other, but may be extended to have different widths along the curve 1603. The opening pattern of the spacer 1640 and the opening pattern of the support sheet 1670 may be at least partially implemented into other different shapes.

According to various embodiments (not illustrated), at least one of the opening pattern of the support sheet 1670 and the opening pattern of the spacer 1640 may be replaced with the recess pattern (e.g., the recess pattern 1104 of FIG. 11) including a plurality of recesses. When the opening pattern of the support sheet 1670 is replaced with the recess pattern, the recess pattern may be formed in one surface of the support sheet 1670 facing the lower panel 630 and/or the other surface of the support sheet 1670 facing the spacer 1640. When the opening pattern of the spacer 1640 is replaced with the recess pattern, the recess pattern may be formed in one surface of the spacer 1640 facing the second part 622 of the base film 620 and/or the other surface of the spacer 1640 facing the support sheet 1670.

According to various embodiments (not illustrated), the opening pattern of the support sheet 1670 or the opening pattern of the spacer 1640 may be omitted.

Figure 17:
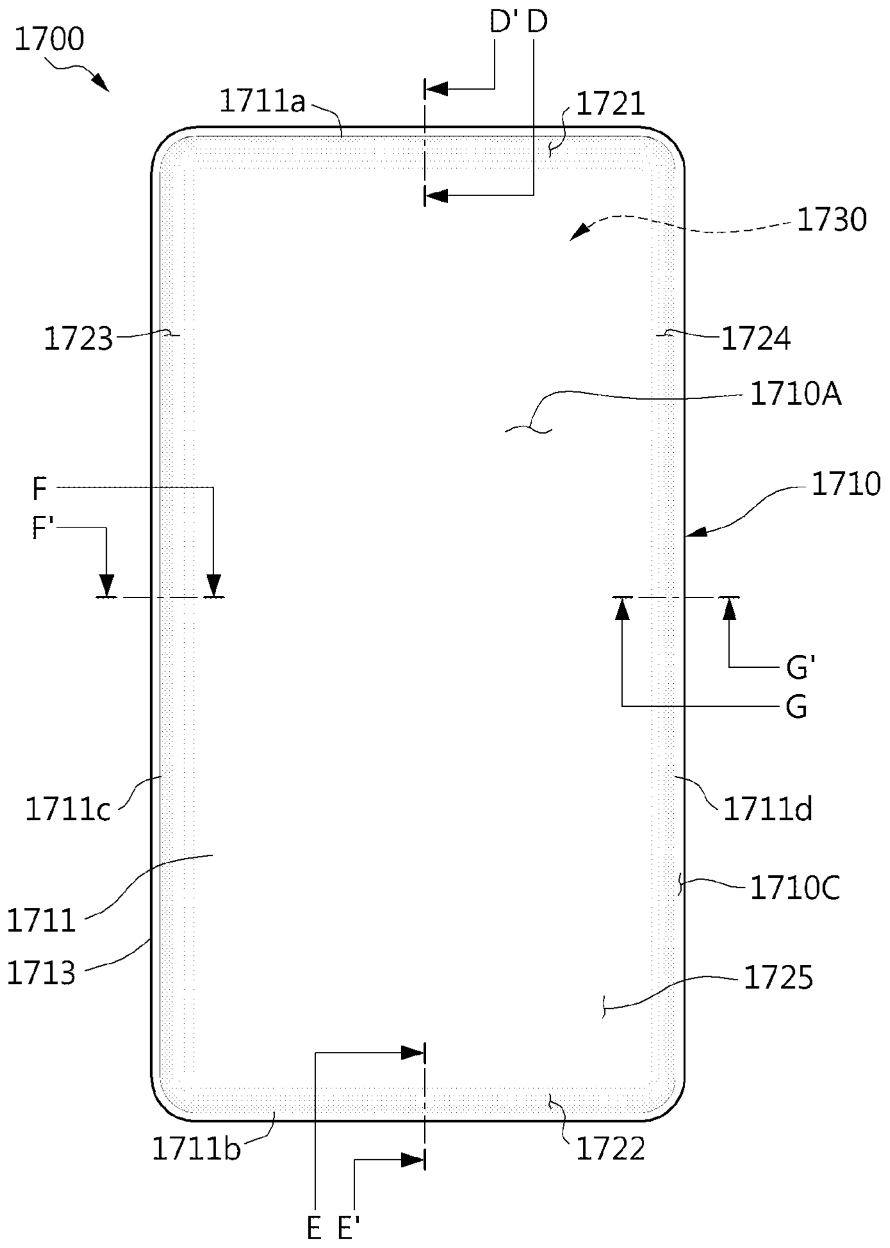
FIG. 17 is a diagram illustrating an electronic device according to various embodiments.

FIG. 17 is a diagram illustrating an electronic device 1700 according to various embodiments.

Referring to FIG. 17, in an embodiment, the electronic device 1700 may include a housing 1710 and a flexible display 1730 positioned inside the housing 1710. An image output through an active area (e.g., screen) of the flexible display 1730 may be viewed through a front surface 1710A of the housing 1710. The housing 1710 may include a front cover 1711 forming a front surface 1710A, a rear cover (not illustrated) forming a rear surface (not illustrated) facing in a direction opposite to the front surface 1710A, and/or a side member (or side bezel structure) 1713 enclosing at least a part of a space between the front cover 1711 and the rear cover and forming a side surface 1710C.

The front cover 1711 may include, for example, a first edge 1711*a*, a second edge 1711*b*, a third edge 1711*c*, and/or a fourth edge 1711*d*. The first edge 1711*a* and the second edge 1711*b* may be positioned opposite to each other, and be substantially parallel to each other. The third edge 1711*c* may connect one end of the first edge 1711*a* and one end of the second edge 1711*b*, and the fourth edge 1711*d* may connect the other end of the first edge 1711*a* and the other end of the second edge 1711*b* and be substantially parallel to the third edge 1711*c*. The front cover 1711 may include a first area 1721 adjacent to the first edge 1711*a*, a second area 1722 adjacent to the second edge 1711*b*, a third area 1723 adjacent to the third edge 1711*c*, and/or a fourth area 1724 adjacent to the fourth edge 1711*d*. The front cover 1711 may include a flat area 1725 between the first area 1721, the second area 1722, the third area 1723, and the fourth area 1724. According to an embodiment, the first area 1721, the second area 1722, the third area 1723, and the fourth area 1724 may be seamlessly curved and extended from the flat area 1725 toward the rear cover and be seamlessly connected to each other. The flexible display 1730 may be extended along the first area 1721, the second area 1722, the third area 1723, the fourth area 1724, and the flat area 1725.

According to an embodiment, a cross-sectional structure of the display assembly included in the electronic device 1700 taken along line DD', line EE', line FF', or line GG' in FIG. 17 may be substantially the same as or similar to a cross-sectional structure in which the support sheet 370 is omitted in the display assembly 700 according to the embodiment of FIG. 7. The sliding plate 120 of FIG. 7 may be replaced with a support plate (e.g., bracket) positioned inside the housing 1710 in the electronic device 1700 according to the embodiment of FIG. 17, and the support plate may be connected to the side member 1713 of FIG. 17 or may be integrally formed with the side member 1713 of FIG. 17. The transparent cover 710 of FIG. 7 may be replaced with a substantially rigid front cover 1711 (e.g., glass cover) in the electronic device 1700 according to the embodiment of FIG. 17. The electronic device 1700 may include a PCB disposed at the support plate between the support plate and the rear cover, and be electrically connected to a display driving circuit (e.g., the display driving circuit 640 of FIG. 7) through a FPCB (e.g., the FPCB 137 of FIG. 7).

FIG. 18 is a block diagram illustrating an example configuration of an electronic device 1801 in a network environment 1800 according to various embodiments.

According to various embodiments, the electronic device 100 of FIG. 2A may be the electronic device 1801 of FIG. 18, may include at least some of components of the electronic device 1801 of FIG. 18, or may additionally include other components. According to various embodiments, the electronic device 100 of FIG. 2A may omit some of the components of the electronic device 1801 of FIG. 18.

Referring to FIG. 18, the electronic device 1801 in the network environment 1800 may communicate with an electronic device 1802 via a first network 1898 (e.g., a short-range wireless communication network), or an electronic device 1804 or a server 1808 via a second network 1899 (e.g., a long-range wireless communication network). According to an embodiment, the electronic device 1801 may communicate with the electronic device 1804 via the server 1808. According to an embodiment, the electronic device 1801 may include a processor 1820, memory 1830, an input module 1850, a sound output module 1855, a display module 1860, an audio module 1870, a sensor module 1876, an interface 1877, a connecting terminal 1878, a haptic module 1879, a camera module 1880, a power management module 1888, a battery 1889, a communication module 1890, a subscriber identification module (SIM) 1896, or an antenna module 1897. In various embodiments, at least one of the components (e.g., the connecting terminal 1878) may be omitted from the electronic device 1801, or one or more other components may be added in the electronic device 1801. In various embodiments, some of the components (e.g., the sensor module 1876, the camera module 1880, or the antenna module 1897) may be implemented as a single component (e.g., the display module 1860).

The processor 1820 may execute, for example, software (e.g., a program 1840) to control at least one other component (e.g., a hardware or software component) of the electronic device 1801 coupled with the processor 1820, and may perform various data processing or computation. According to an embodiment, as at least part of the data processing or computation, the processor 1820 may store a command or data received from another component (e.g., the sensor module 1876 or the communication module 1890) in volatile memory 1832, process the command or the data stored in the volatile memory 1832, and store resulting data in non-volatile memory 1834. According to an embodiment, the processor 1820 may include a main processor 1821 (e.g., a central processing unit (CPU) or an application processor (AP)), or an auxiliary processor 1823 (e.g., a graphics processing unit (GPU), a neural processing unit (NPU), an image signal processor (ISP), a sensor hub processor, or a communication processor (CP)) that is operable independently from, or in conjunction with, the main processor 1821. For example, when the electronic device 1801 includes the main processor 1821 and the auxiliary processor 1823, the auxiliary processor 1823 may be adapted to consume less power than the main processor 1821, or to be specific to a specified function. The auxiliary processor 1823 may be implemented as separate from, or as part of the main processor 1821.

The auxiliary processor 1823 may control, for example, at least some of functions or states related to at least one component (e.g., the display module 1860, the sensor module 1876, or the communication module 1890) among the components of the electronic device 1801, instead of the main processor 1821 while the main processor 1821 is in an inactive (e.g., sleep) state, or together with the main processor 1821 while the main processor 1821 is in an active state (e.g., executing an application). According to an embodiment, the auxiliary processor 1823 (e.g., an image signal processor or a communication processor) may be implemented as part of another component (e.g., the camera module 1880 or the communication module 1890) functionally related to the auxiliary processor 1823. According to an embodiment, the auxiliary processor 1823 (e.g., the neural processing unit) may include a hardware structure specified for artificial intelligence model processing. An artificial intelligence model may be generated by machine learning. Such learning may be performed, e.g., by the electronic device 1801 where the artificial intelligence is performed or via a separate server (e.g., the server 1808). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1830 may store various data used by at least one component (e.g., the processor 1820 or the sensor module 1876) of the electronic device 1801. The data may include, for example, software (e.g., the program 1840) and input data or output data for a command related thereto. The memory 1830 may include the volatile memory 1832 or the non-volatile memory 1834.

The program 1840 may be stored in the memory 1830 as software, and may include, for example, an operating system (OS) 1842, middleware 1844, or an application 1846.

The input module 1850 may receive a command or data to be used by another component (e.g., the processor 1820) of the electronic device 1801, from the outside (e.g., a user) of the electronic device 1801. The input module 1850 may include, for example, a microphone, a mouse, a keyboard, a key (e.g., a button), or a digital pen (e.g., a stylus pen).

The sound output module 1855 may output sound signals to the outside of the electronic device 1801. The sound output module 1855 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1860 may visually provide information to the outside (e.g., a user) of the electronic device 1801. The display module 1860 may include, for example, a display, a hologram device, or a projector and control circuitry to control a corresponding one of the display, hologram device, and projector. According to an embodiment, the display module 1860 may include a touch sensor adapted to detect a touch, or a pressure sensor adapted to measure the intensity of force incurred by the touch.

The audio module 1870 may convert a sound into an electrical signal and vice versa. According to an embodiment, the audio module 1870 may obtain the sound via the input module 1850, or output the sound via the sound output module 1855 or an external electronic device (e.g., an electronic device 1802)(e.g., a speaker or a headphone) directly (e.g., wiredly) or wirelessly coupled with the electronic device 1801.

The sensor module 1876 may detect an operational state (e.g., power or temperature) of the electronic device 1801 or an environmental state (e.g., a state of a user) external to the electronic device 1801, and then generate an electrical signal or data value corresponding to the detected state. According to an embodiment, the sensor module 1876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1877 may support one or more specified protocols to be used for the electronic device 1801 to be coupled with the external electronic device (e.g., the electronic device 1802) directly (e.g., wiredly) or wirelessly. According to an embodiment, the interface 1877 may include, for example, a high definition multimedia interface (HDMI), a universal serial bus (USB) interface, a secure digital (SD) card interface, or an audio interface.

A connecting terminal 1878 may include a connector via which the electronic device 1801 may be physically connected with the external electronic device (e.g., the electronic device 1802). According to an embodiment, the connecting terminal 1878 may include, for example, a HDMI connector, a USB connector, a SD card connector, or an audio connector (e.g., a headphone connector).

The haptic module 1879 may convert an electrical signal into a mechanical stimulus (e.g., a vibration or a movement) or electrical stimulus which may be recognized by a user via his tactile sensation or kinesthetic sensation. According to an embodiment, the haptic module 1879 may include, for example, a motor, a piezoelectric element, or an electric stimulator.

The camera module 1880 may capture a still image or moving images. According to an embodiment, the camera module 1880 may include one or more lenses, image sensors, image signal processors, or flashes.

The power management module 1888 may manage power supplied to the electronic device 1801. According to an embodiment, the power management module 1888 may be implemented as at least part of, for example, a power management integrated circuit (PMIC).

The battery 1889 may supply power to at least one component of the electronic device 1801. According to an embodiment, the battery 1889 may include, for example, a primary cell which is not rechargeable, a secondary cell which is rechargeable, or a fuel cell.

The communication module 1890 may support establishing a direct (e.g., wired) communication channel or a wireless communication channel between the electronic device 1801 and the external electronic device (e.g., the electronic device 1802, the electronic device 1804, or the server 1808) and performing communication via the established communication channel. The communication module 1890 may include one or more communication processors that are operable independently from the processor 1820 (e.g., the application processor (AP)) and supports a direct (e.g., wired) communication or a wireless communication. According to an embodiment, the communication module 1890 may include a wireless communication module 1892 (e.g., a cellular communication module, a short-range wireless communication module, or a global navigation satellite system (GNSS) communication module) or a wired communication module 1894 (e.g., a local area network (LAN) communication module or a power line communication (PLC) module). A corresponding one of these communication modules may communicate with the external electronic device via the first network 1898 (e.g., a short-range communication network, such as BLUETOOTH™, wireless-fidelity (Wi-Fi) direct, or infrared data association (IrDA)) or the second network 1899 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1892 may identify and authenticate the electronic device 1801 in a communication network, such as the first network 1898 or the second network 1899, using subscriber information (e.g., international mobile subscriber identity (IMSI)) stored in the subscriber identification module 1896.

The wireless communication module 1892 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1892 may support a high-frequency band (e.g., the mmWave band) to achieve, e.g., a high data transmission rate. The wireless communication module 1892 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1892 may support various requirements specified in the electronic device 1801, an external electronic device (e.g., the electronic device 1804), or a network system (e.g., the second network 1899). According to an embodiment, the wireless communication module 1892 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1897 may transmit or receive a signal or power to or from the outside (e.g., the external electronic device) of the electronic device 1801. According to an embodiment, the antenna module 1897 may include an antenna including a radiating element including a conductive material or a conductive pattern formed in or on a substrate (e.g., a printed circuit board (PCB)). According to an embodiment, the antenna module 1897 may include a plurality of antennas (e.g., array antennas). In such a case, at least one antenna appropriate for a communication scheme used in the communication network, such as the first network 1898 or the second network 1899, may be selected, for example, by the communication module 1890 (e.g., the wireless communication module 1892) from the plurality of antennas. The signal or the power may then be transmitted or received between the communication module 1890 and the external electronic device via the selected at least one antenna. According to an embodiment, another component (e.g., a radio frequency integrated circuit (RFIC)) other than the radiating element may be additionally formed as part of the antenna module 1897.

According to various embodiments, the antenna module 1897 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1801 and the external electronic device 1804 via the server 1808 coupled with the second network 1899. Each of the electronic devices 1802 or 1804 may be a device of a same type as, or a different type, from the electronic device 1801. According to an embodiment, all or some of operations to be executed at the electronic device 1801 may be executed at one or more of the external electronic devices 1802, 1804, or 1808. For example, if the electronic device 1801 should perform a function or a service automatically, or in response to a request from a user or another device, the electronic device 1801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1801. The electronic device 1801 may provide the outcome, with or without further processing of the outcome, as at least part of a reply to the request. To that end, a cloud computing, distributed computing, mobile edge computing (MEC), or client-server computing technology may be used, for example. The electronic device 1801 may provide ultra low-latency services using, e.g., distributed computing or mobile edge computing. In an embodiment, the external electronic device 1804 may include an internet-of-things (IoT) device. The server 1808 may be an intelligent server using machine learning and/or a neural network. According to an embodiment, the external electronic device 1804 or the server 1808 may be included in the second network 1899. The electronic device 1801 may be applied to intelligent services (e.g., smart home, smart city, smart car, or health-care) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1840) including one or more instructions that are stored in a storage medium (e.g., internal memory 1836 or external memory 1838) that is readable by a machine (e.g., the electronic device 1801). For example, a processor (e.g., the processor 1820) of the machine (e.g., the electronic device 1801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an example embodiment of the disclosure, the electronic device (e.g., the electronic device 100 of FIG. 2A) may include: a support plate (e.g., the sliding plate 120 of FIG. 7). The electronic device may include a flexible display (e.g., the flexible display 130 of FIG. 6A) disposed in the support plate and forming a screen including a flat part (e.g., the flat part 130*a* of FIG. 7), and a curved part (e.g., the first curved part 130*b* of FIG. 7) extending from the flat part. The flexible display may include a first section (e.g., the first section ① of FIG. 7) disposed along the flat part and the curved part and including a plurality of pixels. The flexible display may include a second section (e.g., the second section ② of FIG. 7) bent and extending from the curved part of the first section to be disposed between the first section and the support plate. The electronic device may include a display driving circuit (e.g., the display driving circuit 640 of FIG. 7) disposed in the second section and disposed between the second section and the support plate.

According to an example embodiment of the disclosure, the electronic device may further include a spacer (e.g., the spacer 740 of FIG. 7) disposed between the first section (e.g., the first section ① of FIG. 7) and the second section (e.g., the second section ② of FIG. 7).

According to an example embodiment of the disclosure, the spacer (e.g., the spacer 740 of FIG. 7) may include a plurality of openings disposed along the curved part (e.g., the first curved part **130*b* of FIG. 7**).

According to an example embodiment of the disclosure, the curved part (e.g., the first curved part **130*b* of FIG. 7) may have a smaller radius of curvature as a distance from the flat part (e.g., the flat part 130*a* of FIG. 7**) increases.

According to an example embodiment of the disclosure, a width of the plurality of openings of the spacer (e.g., the spacer 1440 of FIG. 14, the spacer 1540 of FIG. 15, or the spacer 1640 of FIG. 16) extending along the curved part (e.g., the first curved part **130*b* of FIG. 14, 15, or 16**) may be different based on the radius of curvature.

According to an example embodiment of the disclosure, the display driving circuit (e.g., the display driving circuit 640 of FIG. 7) may overlap with the flat part (e.g., the flat part **130*a* of FIG. 7**), when viewed from above the screen.

According to an example embodiment of the disclosure, the support plate (e.g., the sliding plate 120 of FIG. 7) may be configured to slide out from the housing (e.g., the housing 110 of FIG. 1A) of the electronic device. The flexible display (e.g., the flexible display 130 of FIG. 6A) may include the plurality of pixels, and further include a bendable section (e.g., the bendable section ③ of FIG. 6A) extending from the first section (e.g., the first section ① of FIG. 6A or 7) at the opposite side of the second section (e.g., the second section ② of FIG. 6A or 7) and configured to be drawn out from the inner space of the housing during the slide-out. The screen (see FIG. 1A or 2A) may further include another curved part (e.g., the second curved part **130*c* of FIG. 1A or 2A) positioned opposite to the curved part (e.g., the first curved part 130*b* of FIG. 1A or 2A) with the flat part (e.g., the flat part 130*a* of FIG. 1A or 2**A) interposed therebetween and formed by the bendable section.

According to an example embodiment of the disclosure, the two curved parts (e.g., the first curved part **130*b* and the second curved part 130*c* of FIG. 1A or 2A) may be symmetrical to each other with the flat part 130*a* (e.g., the flat part 130*a* of FIG. 1A or 2**A) interposed therebetween.

According to an example embodiment of the disclosure, the electronic device may further include a support sheet (e.g., the support sheet 370 of FIG. 7) disposed in the flexible display (e.g., the flexible display 130 of FIG. 6A) along the first section (e.g., the first section ① of FIG. 7) and the bendable section (e.g., the bendable section ③ of FIG. 6A) and extending between the first section and the second section. The support sheet may include a lattice structure including a plurality of openings formed along the curved part (e.g., the first curved part **130*b* of FIG. 7**) corresponding to a part of the first section.

According to an example embodiment of the disclosure, the curved part (e.g., the first curved part **130*b* of FIG. 7) corresponding to a part of the first section (e.g., the first section ① of FIG. 7) may have a smaller radius of curvature as a distance from the flat part (e.g., the flat part 130*a* of FIG. 7**) increases. According to an example embodiment of the disclosure, a width of the plurality of openings extending along the curved part corresponding to a part of the first section may be different based on the radius of curvature.

According to an example embodiment of the disclosure, the electronic device may further include a spacer (e.g., the spacer 740 of FIG. 7) disposed between the support sheet (e.g., the support sheet 370 of FIG. 7) and the second section (e.g., the second section ② of FIG. 7) and including a material different from that of the support sheet.

According to an example embodiment of the disclosure, the spacer (e.g., the spacer 740 of FIG. 7) may include a plurality of openings disposed along the curved part (e.g., the first curved part **130*b* of FIG. 7) corresponding to a part of the first section (e.g., the first section ① of FIG. 7**).

According to an example embodiment of the disclosure, the support sheet (e.g., the support sheet 370 of FIG. 7) may include stainless steel.

According to various example embodiments of the disclosure, the electronic device (e.g., the electronic device 100 of FIG. 2A) may include a housing (e.g., the housing 110 of FIG. 1A) and a sliding plate (e.g., the sliding plate 120 of FIG. 7) configured to slide out from the housing. The electronic device may include a flexible display (e.g., the flexible display 130 of FIG. 6A). The flexible display may include a first section (e.g., the first section ① of FIG. 6A or 7) overlapping the sliding plate. The flexible display may include a bendable section (e.g., the bendable section ③ of FIG. 6A) extending from the first section and drawn out from an inner space of the housing during the slide-out. The flexible display may include a second section (e.g., the second section ② of FIG. 6A or 7) spaced apart from the bendable section with the first section interposed therebetween and bent from the first section to be extended between the first section and the sliding plate. The electronic device may include a display driving circuit (e.g., the display driving circuit 740 of FIG. 7) disposed in the second section between the second section and the support plate.

According to various example embodiments of the disclosure, the flexible display (e.g., the flexible display 130 of FIG. 1A or 2A) may form a screen (e.g., the screen 1301 of FIG. 1A or 2A). The screen may include a flat part (e.g., the flat part **130*a* of FIG. 1A or 2A) and a first curved part (e.g., the first curved part 130*b* of FIG. 1A or 2A) extending from the flat part. The screen may include a second curved part (e.g., the second curved part 130*c* of FIG. 1A or 2A) extending from the flat part and positioned opposite to the first curved part with the flat part interposed therebetween and formed by the bendable section. The second section (e.g., the second section ② of FIG. 6A or 7) may be bent from the first section at the first curved part side to extend between the first section and the sliding plate (e.g., the sliding plate 120 of FIG. 7**).

According to various example embodiments of the disclosure, the electronic device may further include a support sheet (e.g., the support sheet 370 of FIG. 7) disposed in the flexible display (e.g., the flexible display 130 of FIG. 6A) along the first section (e.g., the first section ① of FIG. 6A or 7) and the bendable section (e.g., the bendable section ③ of FIG. 6A) and extended between the first section and the second section (e.g., the second section ② of FIG. 7). The support sheet may include a lattice structure including a plurality of openings formed along the first curved part (e.g., the first curved part **130*b* of FIG. 7**) corresponding to a part of the first section.

According to various example embodiments of the disclosure, the electronic device may further include a spacer (e.g., the spacer 740 of FIG. 7) disposed between the support sheet (e.g., the support sheet 370 of FIG. 7) and the second section (e.g., the second section ② of FIG. 7) and including a material different from that of the support sheet.

According to various example embodiments of the disclosure, a display assembly (e.g., the display assembly 700 of FIG. 7) may include a flexible display (e.g., the flexible display 130 of FIG. 6A). The flexible display may include a first section (e.g., the first section ① of FIG. 7) including a plurality of pixels and forming a screen including a flat part (e.g., the flat part 130*a* of FIG. 7) and a curved part (e.g., the first curved part 130*b* of FIG. 7) extending from the flat part. The flexible display may include a second section (e.g., the second section ② of FIG. 7) bent and extending from the curved part of the first section and disposed to partially overlap the first section. The display assembly may include a support sheet (e.g., the support sheet 370 of FIG. 7). The support sheet may be disposed in the flexible display along the first section. The support sheet may be disposed between the first section and the second section. The support sheet may include a plurality of openings disposed along the curved part.

According to various example embodiments of the disclosure, the display assembly (e.g., the display assembly 700 of FIG. 7) may further include a display driving circuit (e.g., the display assembly 700 of FIG. 7) disposed in the second section (e.g., the second section ② of FIG. 7).

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
- a support plate;
- a flexible display disposed at the support plate and forming a screen including a flat part and a curved part extending from the flat part,
- wherein the flexible display comprises:
  - a first section disposed along the flat part and the curved part and including a plurality of pixels, and
  - a second section bent and extending from the curved part of the first section and disposed between the first section and the support plate;
- a display driving circuit disposed in the second section and between the second section and the support plate; and
- a spacer disposed between the first section and the second section, the spacer comprising a bending section disposed along the curved part and comprising a plurality of openings disposed along the curved part, wherein the plurality of openings are formed periodically and define a lattice structure in the bending section.

2. The electronic device of claim 1, wherein the curved part has a smaller radius of curvature as a distance from the flat part increases.

3. The electronic device of claim 2, wherein a width of the plurality of openings extending along the curved part is different based on the radius of curvature.

4. The electronic device of claim 1, wherein the display driving circuit overlaps the flat part, when viewed from above the screen.

5. The electronic device of claim 1, wherein the support plate is configured to slide out from a housing of the electronic device,
- the flexible display further comprises a bendable section including a plurality of pixels, extending from the first section at the opposite side of the second section, and configured to be drawn out from an inner space of the housing during a slide-out of the support plate, and
- the screen further comprises another curved part formed by the bendable section and positioned opposite to the curved part with the flat part interposed therebetween.

6. The electronic device of claim 5, wherein the curved part and the another curved part are symmetrical to each other with the flat part interposed therebetween.

7. The electronic device of claim 5, further comprising a support sheet disposed on the flexible display along the first section and the bendable section and extending between the first section and the second section,
- wherein the support sheet comprises a lattice structure including a plurality of openings formed along the curved part corresponding to a part of the first section.

8. The electronic device of claim 7, wherein the curved part corresponding to the part of the first section has a smaller radius of curvature as a distance from the flat part increases.

9. The electronic device of claim 8, wherein a width of the plurality of openings extending along the curved part corresponding to the part of the first section is different based on the radius of curvature.

10. The electronic device of claim 7, further comprising a spacer disposed between the support sheet and the second section and including a material different from that of the support sheet.

11. The electronic device of claim 10, wherein the spacer comprises a plurality of openings disposed along the curved part corresponding to the part of the first section.

12. The electronic device of claim 7, wherein the support sheet comprises stainless steel.

13. An electronic device, comprising:
- a housing;
- a sliding plate capable of sliding out from the housing;
- a flexible display configured to form a screen including a flat part, a first curved part extended from the flat part, and a second curved part extended from the flat part so as to be positioned opposite to the first curved part with the flat part interposed therebetween,
- wherein the flexible display comprises:
  - a first section disposed along the flat part and the first curved part, and disposed to overlap the sliding plate,
  - a bendable section extended from the first section, forming the second curved part, and drawn out from an inner space of the housing during the slide-out, and
  - a second section bent and extended from the first curved part of the first section to be disposed between the first section and the sliding plate,
  - wherein the first section extends between the bendable section and the second section;
- a support sheet disposed on the flexible display along the first section and the bendable section and extending between the first section and the second section, wherein the support sheet comprises a first part disposed along the first section and a second part extending from the first part and disposed along the bendable section, the first part including a first bending section disposed along the first curved part, the first bending section comprising a lattice structure including a plurality of openings formed along the first curved part corresponding to a part of the first section; and a display driving circuit disposed in the second section and disposed between the second section and the sliding plate.

14. The electronic device of claim 13, further comprising a second spacer disposed between the support sheet and the second section and including a material different from that of the support sheet.

15. A display assembly comprising:

a flexible display, wherein the flexible display comprises:

a first section including a plurality of pixels and forming a screen including a flat part and a curved part extended from the flat part, a second section bent and extended from the curved part of the first section to be disposed to partially overlap the first section, and a display driving circuit disposed in the second section; and a support sheet disposed at the flexible display along the first section and comprising a plurality of openings disposed between the first section and the second section and disposed along the curved part, wherein the support sheet comprises a first bending section disposed along the curved part of the first section, the first bending section comprising a lattice structure including a plurality of openings formed along the curved part of the first section.

* * * * *